(12) United States Patent
Dunjic et al.

(10) Patent No.: US 10,839,811 B2
(45) Date of Patent: Nov. 17, 2020

(54) SYSTEM, DEVICE AND METHOD FOR ENFORCING PRIVACY DURING A COMMUNICATION SESSION WITH A VOICE ASSISTANT

(71) Applicant: The Toronto-Dominion Bank, Toronto (CA)

(72) Inventors: Milos Dunjic, Oakville (CA); David Samuel Tax, Toronto (CA); Arthur Carroll Chow, Markham (CA); Peter Glen Nairn, Cobourg (CA); Edward James Hood, Toronto (CA); Martin Albert Lozon, London (CA); John Jong-Suk Lee, Toronto (CA); Arun Victor Jagga, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 209 days.

(21) Appl. No.: 16/144,752

(22) Filed: Sep. 27, 2018

(65) Prior Publication Data
US 2019/0378519 A1 Dec. 12, 2019

Related U.S. Application Data

(63) Continuation-in-part of application No. 16/003,691, filed on Jun. 8, 2018.

(51) Int. Cl.
*G06F 21/00* (2013.01)
*G10L 17/22* (2013.01)
(Continued)

(52) U.S. Cl.
CPC .............. *G10L 17/22* (2013.01); *G06F 21/32* (2013.01); *G06F 21/62* (2013.01); *G10L 17/005* (2013.01)

(58) Field of Classification Search
CPC .............. G10L 17/22; G10L 2015/223; G10L 15/1822; G10L 15/22; G10L 17/005;
(Continued)

(56) References Cited

U.S. PATENT DOCUMENTS 6,023,684 A 2/2000 Pearson
6,907,277 B1 6/2005 Shim
(Continued)

FOREIGN PATENT DOCUMENTS

WO WO2001043338 A1 6/2001
WO 2015106230 A1 7/2015
WO 2017213938 A1 12/2017

OTHER PUBLICATIONS

Notice of Allowance; U.S. Appl. No. 16/003,691 dated Mar. 23, 2020.
(Continued)

*Primary Examiner* — Yogesh Paliwal
(74) *Attorney, Agent, or Firm* — Ridout and Maybee LLP

(57) ABSTRACT

A system, device and method for enforcing privacy during a communication session with a voice assistant are disclosed. In response to a determination that an environment of a first voice assistant device is not private, a first secure communication session between the first voice assistant device and an application server is suspended. In response a determination that one or more other voice assistant devices have been authorized for communication with the application server is made and input to transfer the first secure communication session, a second secure communication session between a second voice assistant device and the application server is initiated. The first secure communication session between the first voice assistant device and the application server is terminated in response to successful initiation of the second secure communication session.

20 Claims, 11 Drawing Sheets

(51) Int. Cl.
*G06F 21/62* (2013.01)
*G10L 17/00* (2013.01)
*G06F 21/32* (2013.01)

(58) Field of Classification Search
CPC ...... G06F 21/6245; G06F 21/32; G06F 21/62; H04L 63/0861; H04L 63/104; H04L 65/1083; H04R 1/406
See application file for complete search history.

(56) References Cited

U.S. PATENT DOCUMENTS

| | | | |
|---|---|---|---|
| 7,130,388 | B1 | 10/2006 | Bell |
| 7,191,233 | B2 | 3/2007 | Miller |
| 7,904,067 | B1 | 3/2011 | Tiwari |
| 8,213,962 | B2 | 7/2012 | Carr |
| 8,233,943 | B1 | 7/2012 | Othmer et al. |
| 8,428,621 | B2 | 4/2013 | Vorbau |
| 8,527,763 | B2 | 9/2013 | Seibert |
| 8,554,849 | B2 | 10/2013 | Heikes |
| 8,738,723 | B1 | 5/2014 | Faaborg et al. |
| 8,823,507 | B1 | 9/2014 | Touloumtzis |
| 8,848,879 | B1 | 9/2014 | Coughlan |
| 9,082,271 | B2 | 7/2015 | Ramaswamy |
| 9,734,301 | B2 | 8/2017 | King |
| 9,798,512 | B1 | 10/2017 | Faaborg |
| 9,824,582 | B2 | 11/2017 | Lopez-Hinojosa |
| 10,140,845 | B1 | 11/2018 | Knas |
| 10,242,673 | B2 | 3/2019 | Cambell |
| 2001/0056401 | A1 | 12/2001 | Tompkins |
| 2004/0183749 | A1 | 9/2004 | Vertegaal |
| 2005/0258938 | A1 | 11/2005 | Moulson |
| 2008/0039021 | A1 | 2/2008 | Fux et al. |
| 2008/0139178 | A1 | 6/2008 | Kawasaki |
| 2010/0202622 | A1 | 8/2010 | Hardee |
| 2010/0205667 | A1* | 8/2010 | Anderson ............... G06F 3/017 726/19 |
| 2012/0078623 | A1 | 3/2012 | Vertegaal et al. |
| 2013/0278492 | A1 | 10/2013 | Stolarz et al. |
| 2013/0324081 | A1 | 12/2013 | Gargi |
| 2014/0026105 | A1 | 1/2014 | Eriksson et al. |
| 2014/0062697 | A1 | 3/2014 | Ramaswamy |
| 2014/0146959 | A1 | 5/2014 | Spence et al. |
| 2014/0207469 | A1 | 7/2014 | Dykstra-Erickson et al. |
| 2015/0088746 | A1 | 3/2015 | Hoffman |
| 2015/0223200 | A1 | 8/2015 | Kim et al. |
| 2015/0347075 | A1 | 12/2015 | Levesque et al. |
| 2016/0028584 | A1 | 1/2016 | Lee et al. |
| 2016/0080537 | A1 | 3/2016 | Kim |
| 2016/0148496 | A1 | 5/2016 | Meredith et al. |
| 2016/0179455 | A1 | 6/2016 | Liu et al. |
| 2016/0261532 | A1 | 9/2016 | Garbin et al. |
| 2016/0343034 | A1 | 11/2016 | Green et al. |
| 2016/0350553 | A1 | 12/2016 | Alameh et al. |
| 2016/0381205 | A1 | 12/2016 | You et al. |
| 2017/0083282 | A1 | 3/2017 | Tsunoda |
| 2017/0148307 | A1 | 5/2017 | Yeom et al. |
| 2017/0156042 | A1 | 6/2017 | Kwan et al. |
| 2017/0193530 | A1 | 7/2017 | Newsum et al. |
| 2017/0273051 | A1 | 9/2017 | Robinson |
| 2017/0316320 | A1 | 11/2017 | Jamjoom et al. |
| 2017/0127226 | A1 | 12/2017 | Allen |
| 2017/0358296 | A1 | 12/2017 | Segalis et al. |
| 2018/0077648 | A1 | 3/2018 | Nguyen |
| 2018/0206083 | A1 | 7/2018 | Kumar et al. |
| 2018/0260782 | A1 | 9/2018 | Bay |
| 2018/0310159 | A1 | 10/2018 | Katz et al. |
| 2018/0359207 | A1 | 12/2018 | Chatterjee |
| 2019/0012444 | A1 | 1/2019 | Lesso et al. |
| 2019/0050195 | A1 | 2/2019 | Knox et al. |
| 2019/0124049 | A1* | 4/2019 | Bradley ................ H04L 63/164 |
| 2019/0165937 | A1* | 5/2019 | Funane ................. H04L 9/3247 |
| 2019/0310820 | A1 | 10/2019 | Bates |
| 2020/0105254 | A1 | 4/2020 | Sarir |

OTHER PUBLICATIONS

Office Action; U.S. Appl. No. 16/144,868 dated Apr. 22, 2020.
Office Action; U.S. Appl. No. 16/144,894 dated Apr. 28, 2020.
Huan Feng, Kassem Fawaz, and Kang G. Shin., Continuous authentication for voice assistants, Proceedings of the 23rd Annual International Conference on Mobile Computing and Networking (MobiCom '17), ACM, Oct. 16-20, 2017, p. 343-355.
Martin Arnold and Hugo Greenhalgh, Banking biometrics: Best of Money: hacking into your account is easier than you think, Financial Times, https://www.ft.com/content/959b64fe-9f66-11e6-891e-abe238dee8e2, Nov. 4, 2016.
Final Rejection; U.S. Appl. No. 16/144,868 dated Aug. 10, 2020.
Final Rejection; U.S. Appl. No. 16/144,894 dated Sep. 14, 2020.

* cited by examiner

SYSTEM, DEVICE AND METHOD FOR ENFORCING PRIVACY DURING A COMMUNICATION SESSION WITH A VOICE ASSISTANT

RELATED APPLICATION DATA

The present disclosure is a continuation-in-part of U.S. patent application Ser. No. 16/003,691, filed Jun. 8, 2018, the content of which is incorporated herein by reference in its entirety.

TECHNICAL FIELD

The present disclosure relates to private communications, and in particular, to a system, device and method for enforcing privacy during a communication session with a voice assistant.

BACKGROUND

Voice-based virtual assistants (also referred to simply as voice assistants) are software applications that use speech recognition to receive, interpret and execute audible commands (e.g., voice commands). Voice assistants may be provided by a mobile wireless communication device such as a smartphone, desktop or laptop computer, smart device (such as a smart speaker) or similar internet-of-things (IoT) device. Because of the varying environments in which voice assistants may be used, the privacy of communications can be a concern. Thus, there is a need for a method of enforcing privacy during a communication session with a voice assistant.

DESCRIPTION OF EXAMPLE EMBODIMENTS

Figure 1A:
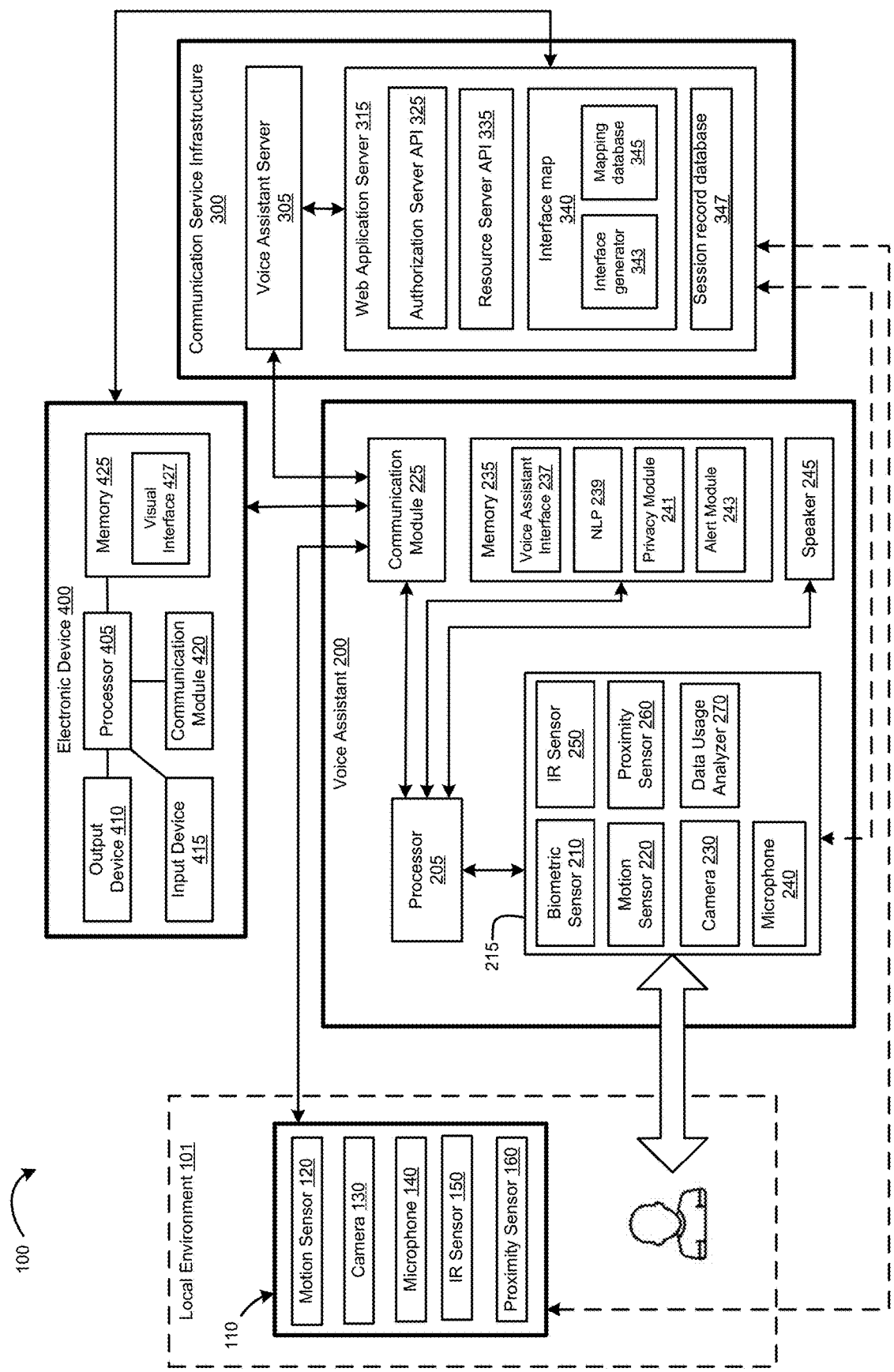
FIGS. 1A and 1B are schematic diagrams of a communication system in accordance with example embodiments of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

In accordance with one embodiment of the present disclosure, there is provided an application server, comprising: a processor; a memory coupled to the processor, the memory having stored thereon executable instructions that, when executed by the processor, cause the application server to: initiate a first secure communication session between a first voice assistant device and the application server for a resource owner, wherein a secure communication session authorizes the application server to access private data in a secure resource and communicate private data from the secure resource to other devices, wherein session data for the first secure communication session is stored by the application server in a secure container; in response to a determination that an environment of the first voice assistant device is not private: suspend the first secure communication session between the first voice assistant device and the application server; determine from an authorization table stored by the application server whether any other voice assistant devices have been authorized for communication with the application server; in response to a determination that one or more other voice assistant devices have been authorized for communication with the application server: cause the first voice assistant device to generate a prompt for input whether to transfer the first secure communication session to one of the one or more other voice assistant devices that have been authorized for communication with the application server; in response to input to transfer the first secure communication session to one of the one or more other voice assistant devices that have been authorized for communication with the application server: initiate a second secure communication session between a second voice assistant device and the application server; and terminate the first secure communication session between the first voice assistant device and the application server in response to successful initiation of the second secure communication session between the second voice assistant device and the application server.

In any of the above, the executable instructions, when executed by the processor, may further cause the application server to: before initiating the second secure communication session between the second voice assistant device and the application server: determine whether a session token for the second voice assistant device is valid; in response to a determination that the session token for the second voice assistant device is not valid; cause the second voice assistant device to generate a prompt for input of a shared secret; determine whether input received in response to the prompt matches the shared secret; and in response to input matching the shared secret, renew the session token and initiate the second secure communication session between the second voice assistant device and the application server.

In any of the above, the executable instructions to determine from the authorization table stored by the application server whether any other voice assistant devices have been authorized for communication with the application server, when executed by the processor, may further cause the application server to: determine for each of the one or more other voice assistant devices in the authorization table whether an access token is stored by the application server.

In any of the above, the executable instructions to determine for each of the one or more other voice assistant devices in the authorization table whether an access token is stored by the application server, when executed by the processor, may further cause the application server to: determine for each access token stored by the application server whether the access token is valid.

In any of the above, the first secure communication session and second secure communication session may be implemented using the OAuth (Open Authorization) 2.0 standard or a successor thereto.

In any of the above, the executable instructions, when executed by the processor, may further cause the application server to: in response to a determination that the one or more other voice assistant devices have been authorized for communication with the application server; determine from the authorization table stored by the application server a device name for each of the one or more other voice assistant devices; wherein the prompt generated by the first voice assistant device identifies each of the one or more other voice assistant devices by a respective device name, the prompt being configured to prompt for selection of one of the one or more other voice assistant devices by the respective device name.

In the above, the executable instructions, when executed by the processor, may further cause the application server to: in response to input of a device name of an authorized voice assistant device: initiate the second secure communication session between the voice assistant device identified by the input device name of an authorized voice assistant device and the application server; and terminate the first secure communication session between the first voice assistant device and the application server in response to successful initiation of the second secure communication session between the voice assistant device identified by the input device name and the application server.

In the above, the executable instructions, when executed by the processor, may further cause the application server to: determine for each of the one or more other voice assistant devices that have been authorized for communication with the application server whether an environment in which the respective voice assistant device is located is private; wherein only devices names for voice assistant devices located in the environment determined to be private are included in the prompt.

In any of the above, wherein the executable instructions, when executed by the processor, may further cause the application server to: determine for each of the one or more other voice assistant devices that have been authorized for communication with the application server whether an environment in which the respective voice assistant device is located is private; wherein the second secure communication session between the second voice assistant device and the application server is initiated only when the environment in which the second voice assistant device is located is determined to be private.

In the above, wherein the executable instructions, when executed by the processor, may further cause the application server to: in response to a determination that none of the one or more other voice assistant devices that have been authorized for communication with the application server is located in an environment that has been determined to be private; cause the first voice assistant device to generate a prompt for input whether to initiate a call back to a designated telephone number; and initiate the call back to the designated telephone number in response to input to initiate the call back.

In any of the above, the executable instructions to determine for each of the one or more other voice assistant devices that have been authorized for communication with the application server whether an environment in which the respective voice assistant device is located is private, when executed by the processor, may further cause the application server to: determine a privacy rating for each of the one or more other voice assistant devices that have been authorized for communication with the application server. In the above, the privacy rating may be provided by each respective voice assistant device. In the above, the privacy rating may be determined by the application server based on sensor data provided by each respective voice assistant device.

In any of the above, he executable instructions to determine for each of the one or more other voice assistant devices that have been authorized for communication with the application server whether an environment in which the respective voice assistant device is located is private, when executed by the processor, may further cause the application server to: receive sensor data by each of the one or more other voice assistant devices that have been authorized for communication with the application server; process the sensor data to determine, for each of the one or more other voice assistant devices that have been authorized for communication with the application server, whether a person is present in the environment in which the respective voice assistant device is located; wherein the environment in which a respective voice assistant device is located is determined to be private only when no person is present in the environment in which the respective voice assistant device is located.

In any of the above, wherein the executable instructions to determine for each of the one or more other voice assistant devices that have been authorized for communication with the application server whether an environment in which the respective voice assistant device is located is private, when executed by the processor, may further cause the application server to: receive sensor data by each of the one or more other voice assistant devices that have been authorized for communication with the application server; process the sensor data to determine, for each of the one or more other voice assistant devices that have been authorized for communication with the application server, whether a person is present in the environment in which the respective voice assistant device is located; in a response to a determination that at least one person is present in the environment in which a respective voice assistant device is located, determine whether the environment of the respective voice assistant device matches one or more predetermined privacy criteria for a multi-person environment; wherein the environment in which a respective voice assistant device is located is determined to be private only when the environment of the respective voice assistant device matches the one or more predetermined privacy criteria for the multi-person environment. In the above, the one or more predetermined privacy criteria for the multi-person environment may comprise each person other than the resource owner being more than a threshold distance from the second voice assistant device. In the above, the one or more predetermined privacy criteria for the multi-person environment may comprise each person other than the resource owner being an authorized user.

In any of the above, the executable instructions, when executed by the processor, may further cause the application server to: periodically during the first communication session determine whether the environment of the first voice assistant device is private.

In any of the above the executable instructions, when executed by the processor, may further cause the application server to: in response to a determination that no other voice assistant devices have been authorized for communication with the application server: cause the first voice assistant device to generate a prompt for input whether to initiate a call back to a designated telephone number; and initiate the call back to the designated telephone number in response to input to initiate the call back.

In accordance with another embodiment of the present disclosure, there is provided a method of transferring a secure communication session between a voice assistant device and an application server, comprising: initiating a first secure communication session between a first voice assistant device and the application server for a resource owner, wherein a secure communication session authorizes the application server to access private data in a secure resource and communicate private data from the secure resource to other devices, wherein session data for the first secure communication session is stored by the application server in a secure container; in response to a determination that an environment of the first voice assistant device is not private: suspending the first secure communication session between the first voice assistant device and the application server; determining from an authorization table stored by the application server whether any other voice assistant devices have been authorized for communication with the application server; in response to a determination that one or more other voice assistant devices have been authorized for communication with the application server: causing the first voice assistant device to generate a prompt for input whether to transfer the first secure communication session to one of the one or more other voice assistant devices that have been authorized for communication with the application server; in response to input to transfer the first secure communication session to one of the one or more other voice assistant devices that have been authorized for communication with the application server: initiating a second secure communication session between a second voice assistant device and the application server; and terminating the first secure communication session between the first voice assistant device and the application server in response to successful initiation of the second secure communication session between the second voice assistant device and the application server.

In accordance with further embodiments of the present disclosure, there are provided non-transitory machine-readable mediums having tangibly stored thereon executable instructions for execution by a processor of a computing device such as a server. The executable instructions, when executed by the processor, cause the computing device to perform the methods described above and herein.

Communication System

Reference is first made to FIG. 1A which shows in schematic block diagram form a communication system 100 in accordance with one example embodiment of the present disclosure. The communication system 100 includes a voice assistant device 200, one or more sensors 110 located in a local environment 101 in the vicinity of the voice assistant device 200, one or more other electronic devices 400, and a communication service infrastructure 300. The voice assistant device 200 is an electronic device that may be a wireless communication device such as a smartphone, desktop or laptop computer, smart device (such as a smart speaker) or similar IoT device. The voice assistant device 200 may function as a voice-based virtual assistant (also referred to simply as a voice assistant). In various embodiments described herein, the voice assistant device 200 may be a primarily audible device, which receives audio input (e.g., voice commands from a user) and outputs audio output (e.g., from a speaker) and which does not make use of a visual interface. In various embodiments described herein, the voice assistant device 200 may be designed to be placed in the local environment 101, and may not be intended to be carried with the user.

The one or more sensors 110 may include a motion sensor 120, a camera 130, a microphone 140, an infrared (IR) sensor 150, and/or a proximity sensor 160, and/or combinations thereof. The one or more sensors 110 are communicatively coupled to the voice assistant device 200 via wireless and/or wired connections. The one or more sensors 110 sense a coverage area within the local environment 101. The one or more sensors 110 may be spaced around the local environment 101 to increase the coverage area. The local environment 101 may be a room, a number of rooms, a house, apartment, condo, hotel or other similar location.

The voice assistant device 200 communicates with the electronic device 400 via a communication network (not shown) such as the Internet. The voice assistant device 200 also communicates with the communication service infrastructure 300 via the communication network. In some examples, the electronic device 400 may also communicate with the communication service infrastructure 300 via the communication network. Different components of the communication system 100 may communicate with each other via different channels of the communication network, in some examples.

The communication network enables exchange of data between the voice assistant device 200, the communication service infrastructure 300 and the electronic device 400. The communication network may comprise a plurality of networks of one or more network types coupled via appropriate methods known in the art, comprising a local area network (LAN), such as a wireless local area network (WLAN) such as Wi-Fi™, a wireless personal area network (WPAN), such as Bluetooth™ based WPAN, a wide area network (WAN), a public-switched telephone network (PSTN), or a public-land mobile network (PLMN), also referred to as a wireless wide area network (WWAN) or a cellular network. The WLAN may include a wireless network which conforms to IEEE 802.11x standards or other communication protocol.

The voice assistant device 200 is equipped for one or both of wired and wireless communication. The voice assistant device 200 may be equipped for communicating over LAN, WLAN, Bluetooth, WAN, PSTN, PLMN, or any combination thereof. The voice assistant device 200 may communicate securely with other devices and systems using, for example, Transport Layer Security (TLS) or its predecessor Secure Sockets Layer (SSL). TLS and SSL are cryptographic protocols which provide communication security over the Internet. TLS and SSL encrypt network connections above the transport layer using symmetric cryptography for privacy and a keyed message authentication code for message reliability. When users secure communication using TSL or SSL, cryptographic keys for such communication are typically stored in a persistent memory of the voice assistant device 200.

The voice assistant device 200 includes a controller comprising at least one processor 205 (such as a microprocessor) which controls the overall operation of the voice assistant device 200. The processor 205 is coupled to a plurality of components via a communication bus (not shown) which provides a communication path between the components and the processor 205.

In this example, the voice assistant device 200 includes a number of sensors 215 coupled to the processor 205. The sensors 215 may include a biometric sensor 210, a motion sensor 220, a camera 230, a microphone 240, an infrared (IR) sensor 250 and/or a proximity sensor 260. A data usage monitor and analyzer 270 may be used to automatically capture data usage, and may also be considered to be a sensor 215. The sensors 215 may include other sensors (not shown) such as a satellite receiver for receiving satellite signals from a satellite network, orientation sensor, electronic compass or altimeter, among possible examples.

The processor 205 is coupled to one or more memories 235 which may include Random Access Memory (RAM), Read Only Memory (ROM), and persistent (non-volatile) memory such as flash memory, and a communication module 225 for communication with the communication service infrastructure 300. The communication module 225 includes one or more wireless transceivers for exchanging radio frequency signals with wireless networks of the communication system 100. The communication module 225 may also include a wireline transceiver for wireline communications with wired networks.

The wireless transceivers may include one or a combination of Bluetooth transceiver or other short-range wireless transceiver, a Wi-Fi or other WLAN transceiver for communicating with a WLAN via a WLAN access point (AP), or a cellular transceiver for communicating with a radio access network (e.g., cellular network). The cellular transceiver may communicate with any one of a plurality of fixed transceiver base stations of the cellular network within its geographic coverage area. The wireless transceivers may include a multi-band cellular transceiver that supports multiple radio frequency bands. Other types of short-range wireless communication include near field communication (NFC), IEEE 802.15.3a (also referred to as UltraWideband (UWB)), Z-Wave, ZigBee, ANT/ANT+ or infrared (e.g., Infrared Data Association (IrDA) communication). The wireless transceivers may include a satellite receiver for receiving satellite signals from a satellite network that includes a plurality of satellites which are part of a global or regional satellite navigation system.

The voice assistant device 200 includes one or more output devices, including a speaker 245 for providing audio output. The one or more output devices may also include a display (not shown). In some examples, the display may be part of a touchscreen. The touchscreen may include the display, which may be a color liquid crystal display (LCD), light emitting diode (LED) display or active-matrix organic light emitting diode (AMOLED) display, with a touch-sensitive input surface or overlay connected to an electronic controller. In some examples, the voice assistant device 200 may be a primarily audible device (e.g., where the voice assistant device 200 is a smart speaker), having only or primarily audio output devices such as the speaker 245. The voice assistant device 200 may also include one or more auxiliary output devices (not shown) such as a vibrator or LED notification light, depending on the type of voice assistant device 200. It should be noted that even where the voice assistant device 200 is a primarily audible device, an auxiliary output device may still be present (e.g., an LED to indicate power is on).

The voice assistant device 200 includes one or more input devices, including a microphone 240 for receiving audio input (e.g., voice input). The one or more input devices may also include one or more additional input devices (not shown) such as buttons, switches, dials, a keyboard or keypad, or navigation tool, depending on the type of voice assistant device 200. In some examples, the voice assistant device 200 may be a primarily audible device (e.g., where the voice assistant device 200 is a smart speaker), having only or primarily audio input devices such as the microphone 240. The voice assistant device 200 may also include one or more auxiliary input devices (not shown) such as a button, depending on the type of voice assistant device 200. It should be noted that even where the voice assistant device 200 is a primarily audible device, an auxiliary input device may still be present (e.g., a power on/off button).

The voice assistant device 200 may also include a data port (not shown) such as serial data port (e.g., Universal Serial Bus (USB) data port).

In the voice assistant device 200, operating system software executable by the processor 205 is stored in the persistent memory of the memory 235 along with one or more applications, including a voice assistant application. The voice assistant application comprises instructions for implementing a voice assistant interface 237 (e.g., a voice user interface (VUI)), to enable a user to interact with and provide instructions to the voice assistant device 200 via audible (e.g., voice) input. The memory 235 may also include a natural language processing (NLP) function 239, to enable audible input to be analyzed into commands, inputs and/or intents, for example. Other applications such as mapping, navigation, media player, telephone and messaging applications, etc. may also be stored in the memory.

The voice assistant application, when executed by the processor 205, allows the voice assistant device 200 to perform at least some embodiments of the methods described herein. The memory 235 stores a variety of data, including sensor data acquired by the sensors 215; user data including user preferences, settings and possibly biometric data about the user for authentication and/or identification; a download cache including data downloaded via the wireless transceivers; and saved files. System software, software modules, specific device applications, or parts thereof, may be temporarily loaded into RAM. Communication signals received by the voice assistant device 200 may also be stored in RAM. Although specific functions are described for various types of memory, this is merely one example, and a different assignment of functions to types of memory may be used in other embodiments.

The communication service infrastructure 300 includes a voice assistant server 305 and a web application server 315. The voice assistant server 305 and the web application server 315 each includes a communication interface (not shown) to enable communications with other components of the communication system 100. The web application server 315 provides an authorization server application programming interface (API) 325, resource server API 335, and an interface map function 340, among other APIs and functions, the functions of which are described below. The web application server 315 may provide services and functions for the voice assistant device 200. For example, the web application server 315 may include the interface map function 340, which may enable a visual user interface (e.g., a graphical user interface (GUI)) to be mapped to an audible user interface (e.g., a voice user interface (VUI)) and vice versa, as discussed further below. The interface map function 340 may include sub-modules or sub-functions, such as an interface generator 343 and a mapping database 345. The web application server 315 may also include a session record database 347, in which a state of an ongoing user session may be saved, as discussed further below. The voice assistant server 305 and the web application server 315 may be operated by different entities, introducing an additional security in allowing the voice assistant server 305 to assess data of the web application server 315, particularly private data such as banking information. In other embodiments, the voice assistant server 305 may be a server module of the web application server 315 rather than a distinct server. Each of the web application server 315 and voice assistant server 305 may be implemented by a single computer system that may include one or more server modules.

The voice assistant application (e.g., stored in the memory 235 of the voice assistant device 200) may be a client-side component of a client-server application that communicates with a server-side component of the voice assistant server 305. Alternatively, the voice assistant application may be a client application that interfaces with one or more APIs of the web application server 315 or IoT device manager 350. One or more functions/modules described as being implemented by the voice assistant device 200 may be implemented or provided by the voice assistant server 305 or the web application server 315. For example, the NLP function 239 may be implemented in the voice assistant server 305 via an NLP module 330 (FIG. 2) instead of the voice assistant device 200. In another example, the voice assistant interface function 237 may not be implemented in the voice assistant device 200. Instead, the web application server 315 or voice assistant server 305 may store instructions for implementing a voice assistant interface with the voice assistant device 200 acting as a thin client that merely acquires sensor data, sends the sensor data to the web application server 315 and/or voice assistant server 305 which processes the sensor data, receives instructions from the web application server 315 and/or voice assistant server 305 in response to the processed sensor data, and performs the received instructions.

The electronic device 400 in this example includes a controller including at least one processor 405 (such as a microprocessor) which controls the overall operation of the electronic device 400. The processor 405 is coupled to a plurality of components via a communication bus (not shown) which provides a communication path between the components and the processor 405.

Examples of the electronic device 400 include, but are not limited to, handheld or mobile wireless communication devices, such as smartphones, tablets, laptop or notebook computers, netbook or ultrabook computers; as well as vehicles having an embedded-wireless communication system (sometimes known as an in-car communication module), such as a Wi-Fi or cellular equipped in-dash infotainment system, or tethered to another wireless communication device having such capabilities. Mobile wireless communication devices may include devices equipped for cellular communication through PLMN or PSTN, mobile devices equipped for Wi-Fi communication over WLAN or WAN, or dual-mode devices capable of both cellular and Wi-Fi communication. In addition to cellular and Wi-Fi communication, a mobile wireless communication device may also be equipped for Bluetooth and/or NFC communication. In various embodiments, the mobile wireless communication device may be configured to operate in compliance with any one or a combination of a number of wireless protocols, including Global System for Mobile communications (GSM), General Packet Radio Service (GPRS), code-division multiple access (CDMA), Enhanced Data GSM Environment (EDGE), Universal Mobile Telecommunications System (UMTS), Evolution-Data Optimized (EvDO), High Speed Packet Access (HSPA), $3^{rd}$ Generation Partnership Project (3GPP), or a variety of others. It will be appreciated that the mobile wireless communication device may roam within and across PLMNs. In some instances, the mobile wireless communication device may be configured to facilitate roaming between PLMNs and WLANs or WANs.

The electronic device 400 includes one or more output devices 410 coupled to the processor 405. The one or more output devices 410 may include, for example, a speaker and a display (e.g., a touchscreen). Generally, the output device (s) 410 of the electronic device 400 is capable of providing visual output and/or other types of non-audible output (e.g., tactile or haptic output). The electronic device 400 may also include one or more additional input devices 415 coupled to the processor 405. The one or more input devices 415 may include, for example, buttons, switches, dials, a keyboard or keypad, or navigation tool, depending on the type of electronic device 400. In some examples, an output device 410 (e.g., a touchscreen) may also serve as an input device 415. A visual interface, such as a GUI, may be rendered and displayed on the touchscreen by the processor 405. A user may interact with the GUI using the touchscreen and optionally other input devices (e.g., buttons, dials) to display relevant information, such as banking or other financial information, etc. Generally, the electronic device 400 may be configured to process primarily non-audible input and to provide primarily non-audible output.

The electronic device 400 may also include one or more auxiliary output devices (not shown) such as a vibrator or LED notification light, depending on the type of electronic device 400. The electronic device 400 may also include a data port (not shown) such as a serial data port (e.g., USB data port).

The electronic device 400 may also include one or more sensors (not shown) coupled to the processor 405. The sensors may include a biometric sensor, a motion sensor, a camera, an IR sensor, a proximity sensor, a data usage analyser, and possibly other sensors such as a satellite receiver for receiving satellite signals from a satellite network, orientation sensor, electronic compass or altimeter.

The processor 405 is coupled to a communication module 420 that comprises one or more wireless transceivers for exchanging radio frequency signals with a wireless network that is part of the communication network. The processor 405 is also coupled to a memory 425, such as RAM, ROM or persistent (non-volatile) memory such as flash memory. In some examples, the electronic device 400 may also include a satellite receiver (not shown) for receiving satellite signals from a satellite network that comprises a plurality of satellites which are part of a global or regional satellite navigation system.

The one or more transceivers of the communication module 420 may include one or a combination of Bluetooth transceiver or other short-range wireless transceiver, a Wi-Fi or other WLAN transceiver for communicating with a WLAN via a WLAN access point (AP), or a cellular transceiver for communicating with a radio access network (e.g., cellular network).

Operating system software executable by the processor 405 is stored in the memory 425. A number of applications executable by the processor 405 may also be stored in the memory 425. For example, the memory 425 may store instructions for implementing a visual interface 427 (e.g., a GUI). The memory 425 also may store a variety of data. The data may include sensor data sensed by the sensors; user data including user preferences, settings and possibly biometric data about the user for authentication and/or identification; a download cache including data downloaded via the transceiver(s) of the communication module 420; and saved files. System software, software modules, specific device applications, or parts thereof, may be temporarily loaded into a volatile store, such as RAM, which is used for storing runtime data variables and other types of data or information. Communication signals received by the electronic device 400 may also be stored in RAM. Although specific functions are described for various types of memory, this is merely one example, and a different assignment of functions to types of memory may be used in other embodiments.

The electronic device 400 may also include a power source (not shown), for example a battery such as one or more rechargeable batteries that may be charged, for example, through charging circuitry coupled to a battery interface such as a serial data port. The power source provides electrical power to at least some of the components of the electronic device 400, and a battery interface may provide a mechanical and/or electrical connection for the battery.

One or more functions/modules described as being implemented by the electronic device 400 may be implemented or provided by the web application server 315. For example, the visual interface function 427 may not be implemented in the electronic device 400. Instead, the web application server 315 may store instructions for implementing a visual interface.

The above-described communication system 100 is provided for the purpose of illustration only. The above-described communication system 100 includes one possible communication network configuration of a multitude of possible configurations. Suitable variations of the communication system 100 will be understood to a person of skill in the art and are intended to fall within the scope of the present disclosure. For example, the communication service infrastructure 300 may include additional or different elements in other embodiments. In some embodiments, the system includes multiple components distributed among a plurality of computing devices. One or more components may be in the form of machine-executable instructions embodied in a machine-readable medium.

Data from the electronic device 400 and/or the sensor(s) 110 may be received by the voice assistant device 200 (e.g., via the communication module 225) for processing, or for forwarding to a remote server, such as the web application server 315 (optionally via the voice assistant server 305), for processing. Data may also be communicated directly between the electronic device 400 and the web application server 315 (e.g., to enable session transfer as discussed further below).

In some examples, sensor data may be communicated directly (indicated by dashed arrows) from the sensor(s) 110 to the remote server (e.g. the web application server 315), for example wirelessly via Wi-Fi, without being handled through the voice assistant device 200. Similarly, the sensors 215 of the voice assistant device 200 may communicate directly (indicated by dashed arrow) with the remote server, (e.g. the web application server 315), for example wirelessly via Wi-Fi, without being handled through the voice assistant server 305. The voice assistant device 200 may still communicate with the voice assistant server 305 for the communications session, but sensor data may be communicated directly to the web application server 315 via a separate data channel.

Figure 1B:
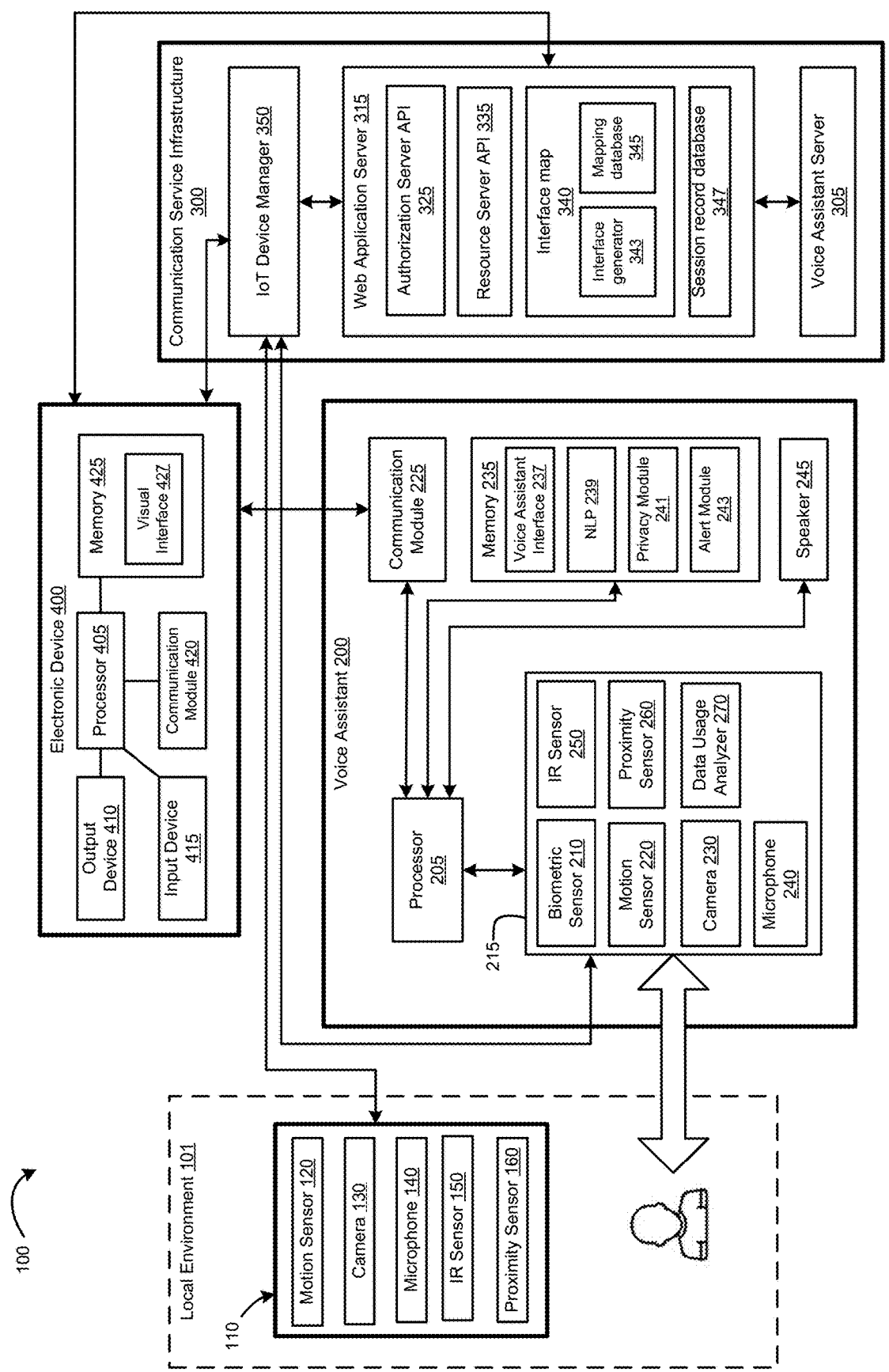

FIG. 1B shows another example embodiment of the communication system 100. The communication system 100 shown in FIG. 1B is similar to the communication system 100 shown in FIG. 1A, with differences as discussed below. In FIG. 1B, the one or more sensors 110 in the local environment 101, the sensors 215 of the voice assistant device 200 and the connected electronic device 400 communicate with an IoT device manager 350 that is part of the communication service infrastructure 300. The IoT device manager 350 is connected to the web application server 315, and forwards the acquired sensor data to the web application server 315 for processing. In the embodiment of FIG. 1B, the voice assistant device 200 may still communicate with the voice assistant server 305 for the communications session, but sensor data may be communicated to the web application server 315 via a separate data channel. Similarly, the electronic device 400 may still communicate with the voice assistant device 200, but sensor data from the electronic device 400 may be communicated to the web application server 315 via the IoT device manager 350. Communication of other data (e.g., other non-sensor data) may be communicated as described above with reference to FIG. 1A.

Web Application Server

Figure 2:
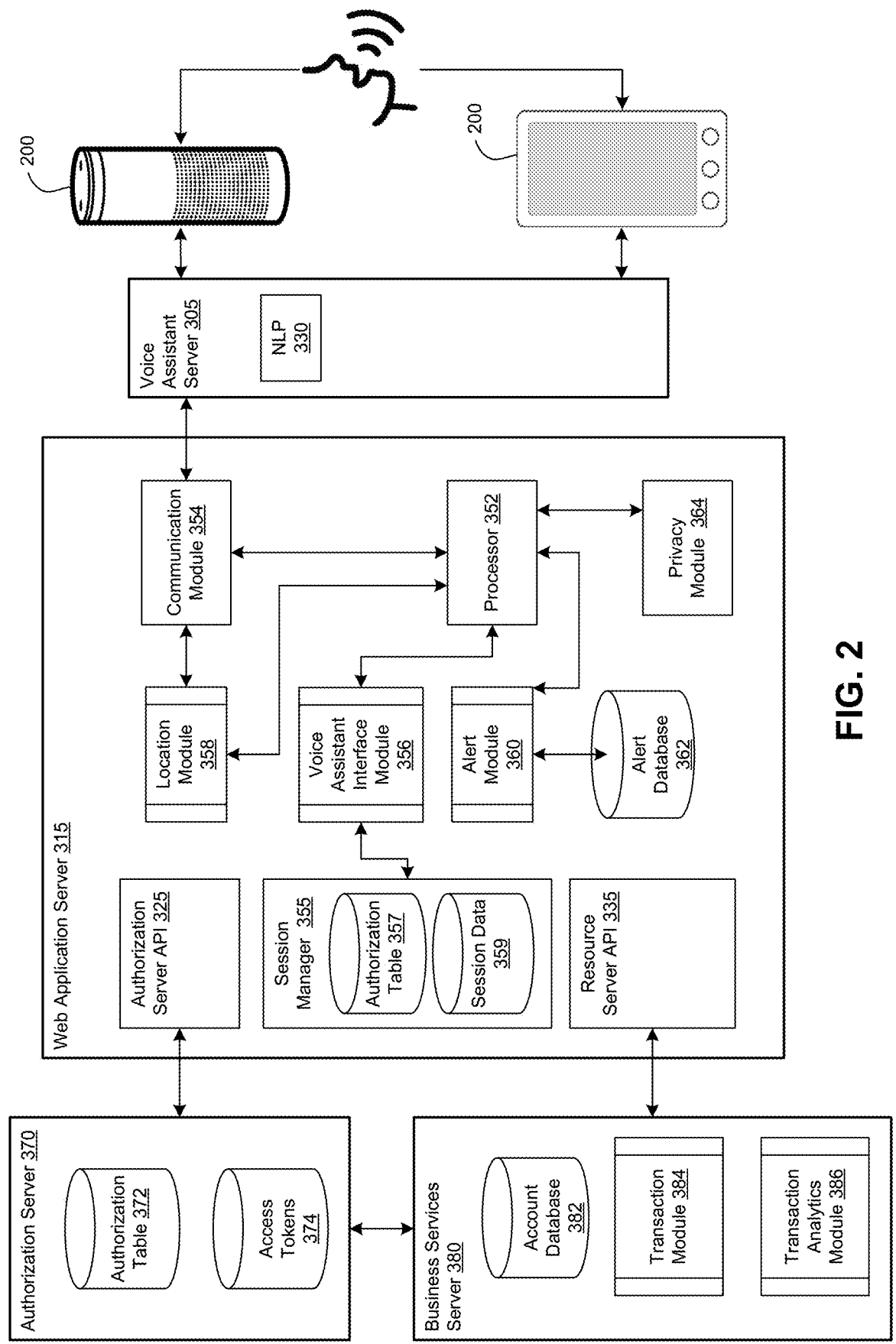
FIG. 2 is a schematic diagram showing the interaction of various modules of a web application server with each other and other elements of the communication system in accordance with one example embodiment of the present disclosure.

Reference is next made to FIG. 2 which illustrates in simplified block diagram form a web application server 315 in accordance with example embodiments of the present disclosure. The web application server 315 comprises a controller comprising at least one processor 352 (such as a microprocessor) which controls the overall operation of the web application server 315. The processor 352 is coupled to a plurality of components via a communication bus (not shown) which provides a communication path between the components and the processor 352. The processor 352 is coupled to a communication module 354 that communicates directly or indirectly with corresponding communication modules of voice assistant devices 200 and possibly other computing devices by sending and receiving corresponding signals. The communication module 354 may communicate via one or a combination of Bluetooth® or other short-range wireless communication protocol, Wi-Fi™, and a cellular, among other possibilities. The processor 352 is also coupled to RAM, ROM, persistent (non-volatile) memory such as flash memory, and a power source.

In the shown embodiment, voice data received by the voice assistant devices 200 is first sent to the voice assistant server 305 which interprets the voice data using the NLP module 330. The NLP module 330, in at least some embodiments, converts speech contained in the voice data into text using speech-to-text synthesis in accordance with speech-to-text synthesis algorithms, the details of which are outside the scope of the present disclosure. The text is then parsed and processed to determine an intent (e.g., command) matching the speech contained in the voice data and one or more parameters for the intent based on a set of pre-defined intents of the web application server 305. The resultant data may be contained in a JavaScript Object Notation (JSON) data packet. The JSON data packet may contain raw text from speech-to-text synthesis and an intent. The training/configuration of the NLP module 330 for the set of intents of the web application server 305 is outside the scope of the present disclosure. The voice assistant server 305 may be provided or hosted by a device vendor of the corresponding voice assistant devices 200. When voice assistant devices 200 from more than one vendor are supported, a voice assistant server 305 may be provided for each vendor.

The web application server 315 may comprise input devices such as a keyboard and mouse or touchscreen and output devices such as a display and a speaker. The web application server may also comprise various data input/output (I/O) ports such as serial data port (e.g., USB data port). Operating system software executed by the processor 352 is stored in the persistent memory but may be stored in other types of memory devices, such as ROM or similar storage element. Applications executed by the processor 352 are also stored in the persistent memory. System software, software modules, specific device applications, or parts thereof, may be temporarily loaded into a volatile store, such as RAM, which is used for storing runtime data variables and other types of data or information. Communication signals received by the web application server 315 may also be stored in RAM. Although specific functions are described for various types of memory, this is merely one example, and a different assignment of functions to types of memory may be used in other embodiments.

The processor 352 is coupled to a location module 358 that determines or monitors the location of voice assistant devices 200 and personal electronic devices of authorized users, a session manager 355 for managing communication sessions with voice assistant devices 200, voice assistant interface module 356 that processes intent data received from the voice assistant devices 200 and generates instructions and data for the voice assistant devices 200 based on the processed intent data, an alert module 360 that monitors for and detects events for generating audible alerts and that generates audible alert instructions for generating audible alerts on an voice assistant device 200, and a privacy module 364. The location module 358, voice assistant interface module 356 and alert module 360 may be implemented in hardware or software stored in the memory of the web application server 315, depending on the embodiment.

The location module 358 maintains a listing of all authorized voice assistant devices 200 and personal electronic devices of all authorized users for a respective user and a location for each voice assistant device 200 as well as a location of the respective user. The voice assistant devices 200 may be a smart device such as a smart speaker or similar IoT device, mobile phone or the like, in-car communication (ICC) module, or a combination thereof, as noted above. Each authorized voice assistant device 200 for a respective user is identified by the location module 358 by a corresponding device identifier (ID) and/or a device name. The location of the respective user may be determined by determining a location associated with a personal electronic device of the user, such as a wearable electronic device adapted to be worn or carried by the user. The personal electronic device may be one of the voice assistant devices 200. More than one personal electronic device may be used to determine the user's location.

The location of the voice assistant devices 200 and the personal electronic device may be determined using any suitable location determining means, such as a Global Navigation Satellite System (GNSS) data (e.g., Global positioning system (GPS) data), cellular signal triangulation, etc., the details of which are known in the art. The location of each audible interface device is determined either directly from each audible interface devices capable of communicating its location or indirectly through another device connected to the voice assistant interface device. Thus, the location module 358 maintains location information comprising a location for each of the voice assistant devices 200 and the personal electronic device. The timeliness or currency of the location information may vary depending on the location determining means used, device status (e.g., powered-on or powered-off), and device location (e.g., is device within range to report location or data used to determined location).

The location module 358 may determine whether the user is within the threshold distance of a voice assistant interface based on the location of the user and the locations of the voice assistant devices 200 in response to a request by the processor 352. Alternatively, the location module 358 may report the location information directly to the processor 352 which then performs the determination based on the location information.

In alternate embodiments, the voice assistant devices 200 and the personal electronic device(s) used to determine the location of the user may communicate to determine a relative distance between the devices. In such embodiments, if the relative distance between the devices is found to be less than a threshold amount (e.g., threshold distance), a communication may be sent to the location module 358 indicating that the two locations are within the threshold distance. The communication may be sent by one or more of the devices or another device, i.e. a proxy device, that enables communication capability.

The web application server 315 comprises the authorization server API 325 and resource server API 335 described above. The resource server API 335 is an API that allows the web application server 315 to communicate securely with a resource server such as a business services server 380 which contains data, including private data, which may be exchanged with the voice assistant devices 200. In the shown embodiment, the business services server 380 may be operated by a financial institution such as a bank and comprises an account database 382 that includes private data in the form of banking data. The business services server 380 also includes various functional modules for performing operations, such as data queries/searches and data transfers (e.g., transactions) based upon the banking data including, for example, a transaction module 384 for performing data transfers/transactions and a transaction analytics module 386 for performing queries/searches and analytics based on the banking data.

Voice assistant devices 200 are authorized and authenticated before communication with the web application server 315 is allowed. The authorization server API 325 is an API that allows the web application server 315 to communicate securely with an authorization server 370 which authenticates and authorizes voice assistant devices 200. The authorization server API 325 maintains authorization information for each voice assistant device 200. The web application server 315 uses the OAuth 2.0 open standard for token-based authentication and authorization in at least some embodiments or similar authentication and authorization protocol. In such embodiments, the authorization information comprises an authorization table 372 that comprises a listing of authorized voice assistant devices 200 and access tokens 374 for the authorized voice assistant devices 200 and possibly similar information for other authorized devices. The authorization table 372 may specify for each of the authorized voice assistant devices 200, a device ID and/or device name, an access token ID, a date the access token was granted, and a date the access token expires.

OAuth defines four roles: a resource owner (e.g., user), a client (e.g., application such as a banking application on a voice assistant device 200), a resource server (e.g., business services server 380), and an authorization server 370. The resource owner is the user who authorizes an application to access their account. The application's access to the user's account is limited to the scope of the authorization granted (e.g., read or write access). The resource server (e.g., business services server 380) hosts the protected user accounts and the authorization server 370 verifies the identity of the user then issues access tokens to the application. A service API may perform both the resource and authorization server roles. The client is the application that wants to access the user's account. Before the application may do so, the application must be authorized by the user and the authorization must be validated by the authorization server 370 and business services server 380.

Figure 10:
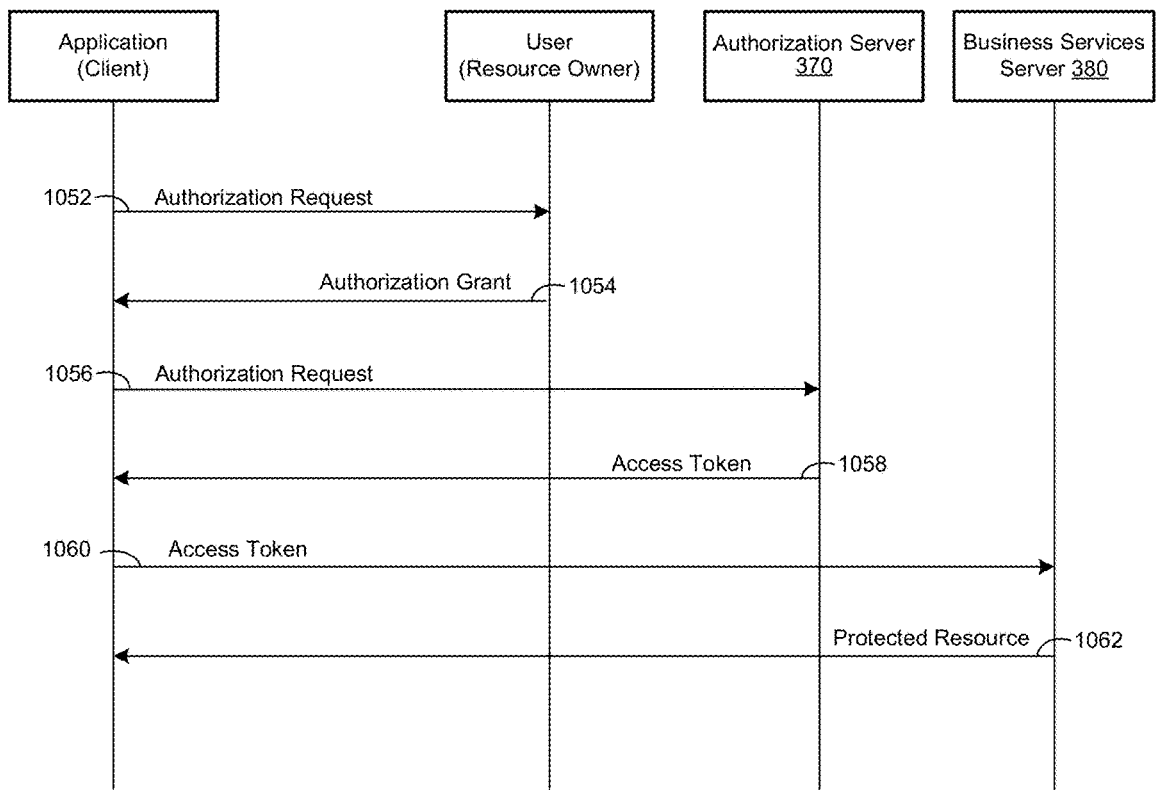
FIG. 10 is a message sequence diagram illustrating a token-based authentication and authorization method suitable for use by example embodiments of the present disclosure.

Referring briefly to FIG. 10, the OAuth 2.0 standard for token-based authentication and authorization will be briefly described. At operation 1052, the application requests authorization to access service resources from the user. At operation 1054, if the user authorized the request, the application receives an authorization grant. At operation 1056, the application requests an access token from the authorization server API 325 by presenting authentication of its own identity and the authorization grant. At operation 1058, if the application identity is authenticated and the authorization grant is valid, the authorization server API 325 issues an access token to the application. Authorization of the application on a voice assistant device 200 is complete. At operation 1060, when application seeks to access the protected resource, the application requests the resource from the resource server API 325 and presents the access token for authentication. At operation 1062, if the access token is valid, the resource server API 325 serves the resource to the application.

The following documents are relevant to the present disclosure: OAuth 2.0 Framework—RFC 6749, OAuth 2.0 Bearer Tokens—RFC 6750, Threat Model and Security Considerations—RFC 6819, OAuth 2.0 Token Introspection—RFC 7662, to determine the active state and meta-information of a token, OAuth 2.0 Token Revocation—RFC 7009, to signal that a previously obtained token is no longer needed, JSON Web Token—RFC 7519, OAuth Assertions Framework—RFC 7521, Security Assertion Markup Language (SAML) 2.0 Bearer Assertion—RFC 7522, for integrating with existing identity systems, and JSON Web Token (JWT) Bearer Assertion—RFC 7523, for integrating with existing identity systems.

Communications from the voice assistant devices 200 to the business services server 380 include the corresponding access token for the respective voice assistant device 200, thereby allowing the respective voice assistant device to access the protected resources. For additional security, a session token may also be included with communications from the voice assistant devices 200 to the business services server 380 in some embodiments, as described below. The session tokens are typically issued by the authorization server 370 using a suitable protocol.

The alert module 360 is configured to monitor for events for generating an audible alert for a user, and detect such events. The alert module 360 may communicate with the business services server 380 via the resource server API 335 to monitor for and detect for events for generating an audible alert for the user. For example, the alert module 360 may implement listeners that monitor for and detected events of the transaction module 384 and/or transaction analytics module 386, among other possibilities. The alert module 360 may store event data for use in generating audible alerts in an alert database 362. Alert data for audible alerts may also be stored in the alert database 362, for example, in association with the corresponding event data. The alert data is derived from, or comprises, the event data.

The privacy module 364 performs a variety of functions related to privacy, depending on the embodiment. The privacy module 364 may receive a privacy rating of the local environment 101 of the voice assistant device 200. The privacy rating is based on location and/or sensor data collected by the voice assistant device 200. The privacy module 364 may also receive the location and/or sensor data upon which the privacy rating was determined. Alternatively, the privacy module 364 may receive location and/or sensor data from the voice assistant device 200 and determine a privacy rating of the local environment 101 of the voice assistant device 200. The nature of the privacy rating may vary. In the simplest form, the private rating may be a bimodal determination of "private" or "non-private". However, other more delineated determinations of privacy may be determined in other embodiments.

The web application server 315, via the privacy module 364, may maintain a privacy rating for each voice assistant device 200 at all times. The privacy rating for each voice assistant device 200 may be fixed or may be dynamically determined by the voice assistant device 200 or by the privacy module 364 of the web application server 315 based on location and/or sensor data. The privacy rating may be based on a privacy confidence interval.

The session manager 355 manages conversations including communication sessions between the web application server 315 and voice assistant devices 200. Each voice assistant device 200 may have a separate, device-specific communication session. The session manager 355 may comprise a conversation manager (not shown) that manages conversations in user engagement applications that span one or more channels such as web, mobile, chat, interactive voice response (IVR) and voice in real-time. A conversation comprises one or more number of user interactions over one or more channels spanning a length of time that are related by context. A conversation may persist between communication sessions in some embodiments. Context may comprise a service, a state, a task or extended data (anything relevant to the conversation). The conversation manager detects events (also known as moments) in the conversation when action should be taken. The conversation manager comprises a context data store, context services, and a business rules system. Context services provide contextual awareness with regards to the user, such as knowing who the user is, what the user wants, and where the user is in this process. Context services also provide tools to manage service, state and tasks.

The session manager 355 stores session data 359 associated with conversations including secure communication sessions between the web application server 315 and voice assistant devices 200. The session data 359 associated with a conversation may be transferred to, or shared with, different endpoints if the conversation moves between channels. The session data 359 may include session tokens in some embodiments, as described below. Session data 359 associated with different sessions in the same conversation may be stored together or linked.

To determine the privacy of the environment 101 of the voice assistant device 200, sensor data is acquired by one or more sensors, which may be fixed or mobile depending on the nature of the sensors. The sensors may comprise one or more sensors of the plurality of sensors 215, one or more sensors in the plurality of sensors 110 located in the environment 101, one or more sensors 415 of a connected electronic device 400 such as user's smartphone, or a combination thereof. Each of the sensor array 110, voice assistant device 200 and electronic devices 400 may have the same sensors, thereby providing the maximum capability and flexibility in determining the privacy of the environment 101 of the voice assistant device 200. The sensor data acquired by the sensors 110, 215, and/or 415 is processed to determine whether a person is present in the local environment 101 and/or a number of persons present in the local environment 101 of the voice assistant device 200 via one or more criteria.

The criteria for determining the privacy of the environment 101 of the voice assistant device 200 may comprise multiple factors to provide multifactor privacy monitoring. For example, voice recognition and object (person) recognition or facial recognition may be performed to determine a number of persons, and optionally to verify and/or identify those persons. The sensor data used to determine whether a person is present in the local environment 101 and/or a number of persons in the environment may comprise one or a combination of a facial data, voice data, IR heat sensor data, movement sensor data, device event data, wireless (or wired) device usage data or other data, depending on the embodiment. The use of voice recognition and possibly other factors is advantageous because voice samples are regularly being gathered as part of the communication session with the voice assistant device 200. Therefore, in at least some embodiments the sensor data comprises voice data.

The sensor data is analyzed by comparing the acquired data to reference data to determine a number of discrete, identified sources. For one example, the sensor data may be used to determine whether a person is present in the local environment 101 and/or a number of persons present in the local environment 101 by performing object (person) recognition on images captured by the camera 130, 230 and/or 430.

For another example, the sensor data may be used to determine whether a person is present in the local environment 101 and/or a number of faces present in images captured by the camera 130, 230 and/or 430 by performing facial recognition on images captured by the camera 130, 230 and/or 430, with unique faces being a proxy for persons.

For yet another example, the sensor data may be used to determine whether a person is present in the local environment 101 and/or a number of voices in audio samples captured by the microphone 140, 240 and/or 440 by performing voice recognition on audio samples captured by the microphone 140, 240 and/or 440, with unique voices being a proxy for persons.

For yet another example, the sensor data may be used to determine whether a person is present in the local environment 101 and/or a number of persons present in the local environment 101 by identifying human heat signatures in IR image(s) captured by the IR sensor 150, 250 and/or 450 by comparing the IR image(s) to a human heat signature profile via heat pattern analysis, with human heat signatures being a proxy for persons.

For yet another example, the sensor data may be used to determine whether a person is present in the local environment 101 and/or a number of persons present in the local environment 101 by identifying a number sources of movements in motion data captured by the motions sensor 120, 220 and/or 420 by comparing the motion data to a human movement profile via movement analysis, with human heat signatures being a proxy for persons.

For yet another example, the sensor data may be used to determine whether a person is present in the local environment 101 and/or a number of persons present in the local environment 101 by detecting wireless communication devices in the local environment 101 and determining the number of wireless communication devices, with unique wireless communication devices being a proxy for persons. The wireless communication devices may be smartphones in some embodiments. The wireless communication devices may be detected in a number of different ways. The wireless communication devices may be detected by the voice assistant device 200 or sensor array 110 when the wireless communication devices are connected to a short-range and/or long-range wireless communication network in the local environment 101 using suitable detecting means. For example, the wireless communication devices may be detected by detecting the wireless communication devices on the short-range and/or long-range wireless communication network, or by detecting a beacon message, broadcast message or other message sent by the wireless communication devices when connecting to or using the short-range and/or long-range wireless communication network via a short-range and/or long-range wireless communication protocol (e.g., RFID, NFC™, Bluetooth™, Wi-Fi™, cellular, etc.) when the wireless communication devices are in, or enter, the local environment 101. The message may be detected by a sensor or communication module of the voice assistant device 200 (such as the communication module 225 or data usage monitor and analyzer 270) or sensor array 110.

The wireless communication devices in the local environment 101 can be identified by a device identifier (ID) in the transmitted message, such as a media access control (MAC) address, universally unique identifier (UUID), International Mobile Subscriber Identity (IMSI), personal identification number (PIN), etc., with the number of unique device IDs being used to determine the number of unique wireless communication devices.

The privacy module, to determine the number of persons in the local environment 101, monitors for and detects wireless communication devices in the local environment 101 of the voice assistant device 200, each wireless communication device in the local environment of the voice assistant device 200 being counted as a person in the local environment 101 of the voice assistant device 200. The count of the number of devices in the local environment 101 of the voice assistant device 200 may be adjusted to take into account electronic devices 400 of the authenticated user, for example, using the device ID of the electronic devices 400. The device ID of the electronic devices 400 may be provided in advance, for example, during a setup procedure, so that electronic devices 400 of the authenticated user are not included in the count of the number of devices in the local environment 101 of the voice assistant device 200, or are deduced from the count when present in the local environment 101 of the voice assistant device 200.

For yet another example, the sensor data may be used to determine whether a person is present in the local environment 101 and/or a number of persons present in the local environment 101 by identifying a number of active data users (as opposed to communication devices, which may be active with or without a user) by performing data usage analysis on the data usage information captured by the data usage monitor and analyzer 270, with active data users being a proxy for persons.

The assessment of whether the environment is "private" may consider the geolocation of the voice assistant device 200. In some examples, if the geolocation is "private", other persons may be present but if the geolocation of the environment is not "private", no other persons may be present. In some examples, if the geolocation of the environment is "private", other persons may be present only if each person in the local environment 101 of the voice assistant device 200 is an authorized user whereas in other examples the other persons need not be an authorized user.

The voice assistant device 200 may use GPS data, or triangulation via cellular or WLAN access, to determine its geolocation if unknown, and determine whether the geolocation is "private". The determination of whether the determined geolocation is "private" may comprise comparing the determined geolocation to a list of geolocation designated as "private", and determining whether the determined geolocation matches a "private" geolocation. A determined geolocation may be determined to match a "private" geolocation when it falls within a geofence defined for the "private" geolocation. A geofence is a virtual perimeter defined by a particular geographic area using geo-spatial coordinates, such as latitude and longitude. The "private" geolocations may be a room or number of rooms of a house, hotel, apartment of condo building, an entire house, a hotel, or apartment of condo building, a vehicle, or other comparable location. The determined geolocations and "private" geolocations are defined in terms of a geographic coordinate system that depends on the method of determining the geolocation. A common choice of coordinates is latitude, longitude and optionally elevation. For example, when GPS is used to determine the geolocation, the geolocation may be defined in terms of latitude and longitude, the values of which may be specified in one of a number of different formats including degrees minutes seconds (DMS), degrees decimal minutes (DDM), or decimal degrees (DD).

Whether a particular geolocation is private may be pre-set by the user, the web application server 315 (or operator thereof) or a third party service. Alternatively, whether a particular geolocation is private may be determined dynamically in real-time, for example, by the voice assistant device 200 or privacy module 364 of the web application server 315, or possibly by prompting a user, depending on the embodiment. Each "private" geolocation may have a common name for easy identification by a user, such as "home", "work", "school", "car", "Mom's house", "cottage", etc. When the "private" geolocation is a mobile location such as a vehicle, the geofence that defines the "private" geolocation is determined dynamically. Additional factors may be used to identify or locate a mobile location, such as a smart tag (e.g., NFC tag or similar short-range wireless communication tag), wireless data activity, etc.

Figure 3:
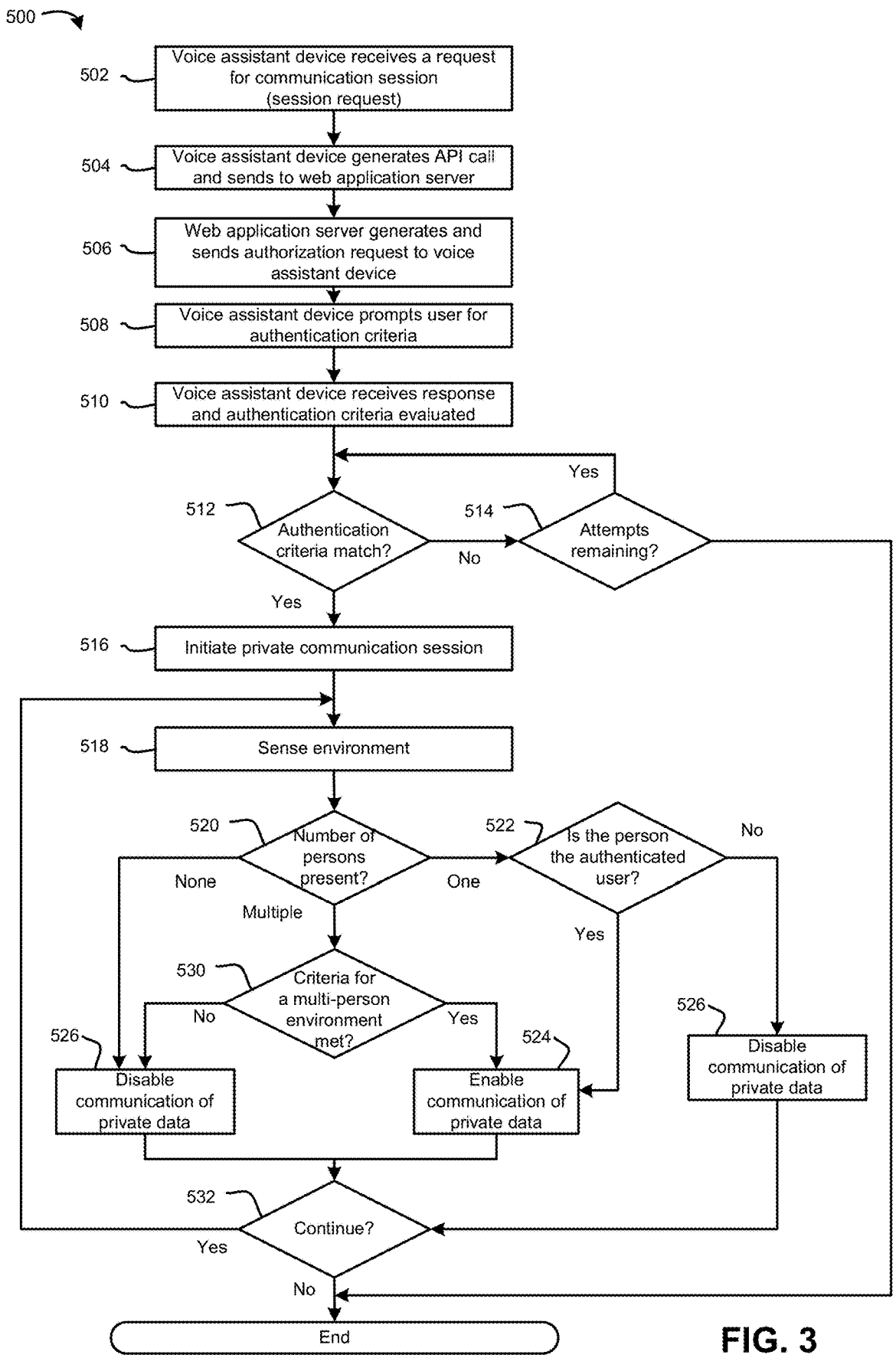
FIG. 3 is a flowchart illustrating a method of enforcing privacy during a communication session with a voice assistant on an electronic device in accordance with one example embodiment of the present disclosure.

Methods of Enforcing Privacy During a Communication Session with a Voice Assistant Referring next to FIG. 3, a method 500 of enforcing privacy during a communication session with a voice assistant in accordance with one example embodiment of the present disclosure will be described. The method 500 is performed by a voice assistant device 200 which, as noted above, may be a multipurpose communication device, such as a smartphone or tablet running a VA application, or a dedicated device, such as an IoT device (e.g., smart speaker or similar smart device).

At operation 502, a user inputs a session request for a secure communication session with a voice assistant of a web application. The secure communication session authorizes the voice assistant server 305 to access private data in a secure resource, such as a bank server, via the resource server API 335 and communicate private data from the secure resource to authorized voice assistant devices 200. Session data for the first secure communication session is stored by the voice assistant server 305 in a secure container. An example of the secure communication session is a private banking session initiated by a banking application of a financial institution on the voice assistant device 200. The banking application may be used to view balances, initiated data transfers/transactions, and other functions. The session request is made verbally by the user in the form of a voice input that is received by the microphone 240 of the voice assistant device 200. Alternatively, the session request may be input via another input device, such as a touchscreen, with the communication session with the web application to be performed verbally. Alternatively, the session request may be input via another electronic device 400 connected to the device 200, such as a wireless mobile communication device (e.g., smartphone, tablet, laptop computer or the like) wirelessly connected to the voice assistant device 200.

The processor 205 of the voice assistant device 200 receives and interprets the voice input, and the session request is detected by the voice assistant device 200. Interpreting the voice input by the voice assistant device 200 comprises performing speech recognition. Interpreting the voice input by the voice assistant device 200 may also comprise voice recognition to identify one or more words in the voice sample, matching the one or more words to a command (or instruction) and optionally one or more parameters (or conditions) for executing the command depending on the matching command (or instruction).

Speech recognition is the process of converting a speech into words. Voice recognition is the process of identifying a person who is speaking. Voice recognition works by analyzing the features of speech that differ between individuals. Every person has a unique pattern of speech that results from anatomy (e.g., size and shape of the mouth and throat, etc.) and behavioral patterns (voice's pitch, speaking style such as intonation, accent, dialect/vocabulary, etc.). Speaker verification is a form of voice recognition in which a person's voice is used to verify the identity of the person. With a suitable sample of a user's speech, a person's speech patterns can be tested against the sample to determine if the voice matches, and if so, the person's identify is verified. Speaker identification is a form of voice recognition in which an unknown speaker's identity is determined by comparing a sample against a database of samples until a match is found.

At operation 504, the processor 205 of the voice assistant device 200 generates an API call for the session request. The API call is sent by the voice assistant device 200 to the voice assistant server 305 via the communication module 225, typically via wireless transceivers. The voice assistant server 305 forwards the API call to the web application server 315 providing the web application and its communication service, such as the banking session for the banking application of the financial instruction. Alternatively, in other embodiments the API call is sent by the voice assistant device 200 directly to the web application server 315 without a voice assistant server 305.

At operation 506, the authorization server API 325 of the web application server 315 generates a user authentication request in response to the session request, and sends the user authentication request to the voice assistant device 200 via the voice assistant server 305. The web application server 315 typically requires a specific form of user authentication. However, the web application server 315 could permit user authentication in one of a number of approved forms of user authentication. User authentication may be performed via user credentials, such as a combination of user name and shared secret (e.g., password, passcode, PIN, security question answers or the like), biometric authentication, a digital identifier (ID) protocol or a combination thereof among other possibilities.

The web application server 315 may send the user authentication request to the voice assistant device 200 indirectly via the voice assistant server 305 when user authentication is to be provided by voice input via the microphone 240 or directly when the user authentication can be provided by other means, such as an alternative input device on the voice assistant device 200 such as a biometric sensor 210, camera 230, or input device touchscreen or keyboard.

At operation 508, the voice assistant device 200 prompts the user to authenticate themselves via one or more first criteria using an identification process. The one or more first criteria may comprise a shared secret and one or more biometric factors, as described more fully below. The prompt is typically an audible announcement via the speaker 245 but could be via a display of the voice assistant device 200 depending on the capabilities and configuration of the voice assistant device 200.

At operation 510, the user provides input for authentication that is sent to the authorization server API 325 for verification either directly or indirectly via the voice assistant server 305. Alternatively, the verification could be performed locally on the voice assistant device 200. This may be preferable when the one or more first criteria comprises biometric factors, such as voice or facial recognition, for increased security by ensuring that biometric data, such as biometric samples, biometric patterns and/or biometric matching criteria used for comparison, are stored locally. The local storage of biometric data reduces the likelihood that biometric data may be exposed compared with storing biometric data on the authorization server API 325 which is more likely to be hacked or otherwise compromised.

The one or more first criteria may comprise a shared secret and one or more biometric factors acquired during the input via a keyboard of the voice assistant device 200 in some examples. This is sometimes known as multi-form criteria. The biometric factors may comprise typing cadence, fingerprint recognition, voice recognition, facial recognition, or a combination thereof. Typing cadence may be captured by a hardware or software (virtual) keyboard. Fingerprints may be captured by a fingering sensor which may be embedded within an input device such as a home button of the voice assistant device 200 or touchscreen of the voice assistant device 200 when the keyboard is a software keyboard. Voice samples for voice recognition may be captured by a microphone of the voice assistant device 200, sensors 110 in the local environment, or possibly a connected electronic device 400 such as the user's smartphone. Images for facial recognition may be captured by a camera of the voice assistant device 200, sensors 110 in the local environment, or possibly a connected electronic device 400 such as the user's smartphone.

At operation 512, the authorization server API 325 attempts to verify the received user input to authenticate the user.

If the user input does not match stored authentication criteria, authentication fails and a notification is sent to the voice assistant device 200 either directly or indirectly, for example via the voice assistant server 305 (operation 514). The notification concerning the results of the authentication process is provided to the user via the voice assistant device 200, typically by an audible notification via the speakers 245 but possibly via a display of the voice assistant device 200 depending on the capabilities and configuration of the voice assistant device 200. The user may be prompted to try again in response to a failed authentication, possibly up to a permitted number of attempts before a lockout or other security measure is performed, for example by the voice assistant device 200 and/or authorization server API 325.

At operation 514, the authorization server API 325 determines if any attempts in the permitted number of attempts are remaining (e.g., is the number of attempts <n, where n is the permitted number of attempts). If one or more attempts in the permitted number of attempts are remaining, the voice assistant device 200 again prompts the user to authenticate themselves. If no attempts are remaining, the method 500 ends.

Alternatively, or in addition to restricting the permitted number of attempts, the authorization server API 325 may determine (e.g., calculate) a probability (or confidence level) of fraudulent activity during the authentication/authorization process. The determination of a probability of fraudulent activity may be performed in a variety of ways including but not limited to checking a biofactor during user input, e.g., typing cadence or fingerprint during input of a shared secret via a hardware or software keyboard or voice recognition during input of a shared secret via a speech recognition). In addition to, or instead of checking a biofactor, the determination of a probability of fraudulent activity may be based on a software daemon (e.g., background software service or agent) that monitors for and detects malicious software attempting to bypass or circumvent the authentication/authorization process. If the determined probability of fraudulent activity exceeds a fraudulent activity threshold, the number of remaining attempts may be reduced by a predetermined amount, which may depend on the determined probability of fraudulent activity. For example, if the determined probability of fraudulent activity exceeds 35% but is less than 50%, the number of remaining attempts may be reduced by 1 or 2 attempts, whereas if the determined probability of fraudulent activity exceeds 50%, the number of remaining attempts may be reduced by 5 attempts or to no remaining attempts.

If the user input matches stored authentication criteria, authentication is successful, a notification is sent to the voice assistant device 200 either directly or indirectly, for example via the voice assistant server 305, and the communication session with the voice assistant is initiated in response to the successful authentication of the user (operation 516). In response to successful authentication, the user may be notified that a secure communication session has been initiated with the user's private data (such as banking and/or personal information) and may provide the user with instructions to assist in ensuring that the local environment 101 of the user is private. The meaning of the term "private" may vary depending on the embodiment. The term "private" may mean that (i) the authenticated user is alone in the local environment 101, (ii) that more than one person is present in the local environment 101 but that any other persons in the local environment 101 other than the authenticated user are authorized users (i.e., only authorized persons are present in the local environment 101), (iii) that more than one person is present in the local environment 101 but that any other persons in the local environment 101 other than the authenticated user are authorized users and are more than a threshold distance away (e.g., other authorized users are permitted with the threshold distance), or (iv) that any additional persons other than the authenticated user are more than a threshold distance away regardless of whether such users are authorized users, depending on the embodiment, as described more fully below.

At one or more times after the communication session with the voice assistant has been initiated, the privacy of the vicinity around the authenticated user/voice assistant device 200 is determined by the voice assistant device 200. That is, the voice assistant device 200 determines whether the vicinity (i.e., the local environment 101) around the authenticated user/voice assistant device 200 is private. This comprises collecting and analyzing sensor data acquired by one or more sensors 110 in the local environment, incorporated within the voice assistant device 200, or possibly incorporated within a connected electronic device 400 such as a user's smartphone. The voice assistant device 200 may also determine whether the local environment 101 around the authenticated user/voice assistant device 200 is private before initiating the communication session in some embodiments.

The privacy of the environment 101 may be determined before or at the start of the communication session and at regular intervals thereafter, possibly continuously or substantially continuously. The term "continuously" means at every opportunity or sample, which may vary depending on the sensor data used to determine the privacy of the environment 101 and the capabilities of the device analysing the sensor data. For example, if the privacy of the environment 101 is determined by voice recognition, privacy may be determined at each voice sample/voice input received by the voice assistant device 200. A voice sample/input may be a discrete input, such as a command or instruction by the user or response, a sentence, a word or suitably sized voice sample, depending on the capabilities of the device analysing the sensor data.

At operation 518, to determine the privacy of the environment 101, sensor data is acquired by one or more sensors, which may be fixed or mobile depending on the nature of the sensors, such as the host device. The sensors may comprise one or more sensors of the plurality of sensors 215, one or more sensors in the plurality of sensors 110 located in the environment 101, one or more sensors 415 of a connected electronic device 400 such as user's smartphone, or a combination thereof. The processor 205 processes the sensor data acquired by the sensors 110, 215, and/or 415 to determine whether a person is present in the local environment 101, and if a person is present in the local environment 101, a number of persons present in the local environment 101 of the voice assistant device 200 via one or more second criteria (operation 520). Alternatively, the sensor data may be sent to a remote server for processing.

The one or more second criteria may comprise multiple factors to provide multifactor privacy monitoring. For example, voice recognition and object (person) recognition or facial recognition may be performed to determine a number of persons, and optionally to verify and/or identify those persons. The use of secrets (such as a password, passcode, PIN, security question answers or the like) in combination with biometrics is advantageous in that biometrics may be publically exposed and can be detected by determined attackers. Thus, multi-form criteria, such as two-form criteria comprising secrets and biometrics, may be used for the one or more second criteria to determine a number of persons and optionally to verify and/or identify those persons. Two-form criteria comprising secrets and biometrics may also be used as the one or more first criteria to authenticate the user, as described above.

The one or more second criteria used to determine whether a person is present in the local environment 101 and/or a number of persons in the local environment 101 of the voice assistant device 200 may be different from the one or more first criteria used to authenticate the user to increase security. For example, the one or more first criteria may be user credentials, such as a username and shared secret, and the one or more second criteria may be a biometric factor. For another example, the one or more first criteria may be user credentials and one or more biometric factors whereas the one or more second criteria may be one or more different biometric factors. For a further example, the one or more first criteria may be user credentials and one or more biometric factors whereas the one or more second criteria may be the biometric factors of the one or more first criteria.

When one person is present in the local environment 101 of the voice assistant device 200, the sensor data is processed to identify (or attempt to identify) the one person and determine whether the one person is the authenticated user based on whether the one person is identified as the authenticated user (operation 522). In some embodiments, voice recognition and optionally facial recognition or other biometric factors are used to identify the person. Voice recognition is advantageous because voice samples are regularly being gathered as part of the communication session with the voice assistant. The voice assistant device 200 may use the previously sensed data and the one or more first criteria or a subset of the one or more first criteria to identify (or attempt to identify) the person, or acquire new sensor data to identify (or attempt to identify) the one person. For example, the voice assistant device 200 may use voice recognition and optionally facial recognition as one or more second criteria to identify the person while using a shared secret and optionally a biometric factor as the one or more first criteria to authenticate the user.

When the one person in the local environment 101 of the voice assistant device 200 is determined to be the authenticated user, communication of private data by the voice assistant is enabled (operation 524). When the one person in the local environment 101 of the voice assistant device 200 is determined not to be the authenticated user, communication of private data by the voice assistant is disabled (operation 526). The data that is considered to be private data is determined by business rules of the authorization server API 325 and/or resource server API 335, which may vary between embodiments. For example, in some embodiments private data may comprise all banking data and personal data associated the authenticated user whereas non-private data may comprise information not associated with any user, such as local branch information (e.g., address and business hours), general contact information (e.g., toll free telephone number), etc.

When no one is present in the local environment 101 of the voice assistant device 200, communication of private data by the voice assistant may also be disabled (operation 526).

When more than one person is present in the local environment 101 of the voice assistant device 200, the sensor data is processed to determine whether the local environment 101 of the voice assistant device 200 matches one or more predetermined privacy criteria for a multi-person environment (operation 530). The one or more predetermined privacy criteria for a multi-person environment may involve assessing whether the local environment 101 is "private". The term "private" in the context of a multi-person environment may be that only authorized persons are present, that unauthorized persons are more than a threshold distance away, or that any persons other than the authorized users are more than a threshold distance away, as described more fully below. The one or more predetermined privacy criteria for a multi-person environment may comprise each person in the local environment 101 of the voice assistant device 200 being an authorized user, each person other than the authenticated user being more than a threshold distance from the authenticated user, or a combination thereof (i.e., any person within the threshold distance must be an authorized user).

The assessment of whether the multi-person environment is "private may consider the geolocation of the voice assistant device 200, as described above. In some examples, if the geolocation of the multi-person environment is "private", other persons may be present but if the geolocation of the multi-person environment is not "private", no other persons may be present. In some examples, if the geolocation of the multi-person environment is "private", other persons may be present only if each person in the local environment 101 of the voice assistant device 200 is an authorized user whereas in other examples the other persons need not be an authorized user.

In operation 530, determining whether the local environment 101 of the voice assistant device 200 matches one or more predetermined privacy criteria for a multi-person environment, may be implemented in a variety of ways. The voice assistant device 200, when more than one person is present in the local environment 101 of the voice assistant device 200, may sense the local environment 101 of the voice assistant device 200 via the plurality of sensors 110, 215 or 415 to generate sensed data. The sensed data may comprise motion data from motion sensors 120, 220 or 420, images from cameras 130, 230 or 430, audio samples from the microphones 140, 240 or 440, IR data from IR sensors 150, 250 or 450, proximity data from proximity sensors 160, 260 or 460, or a combination thereof.

Figure 8:
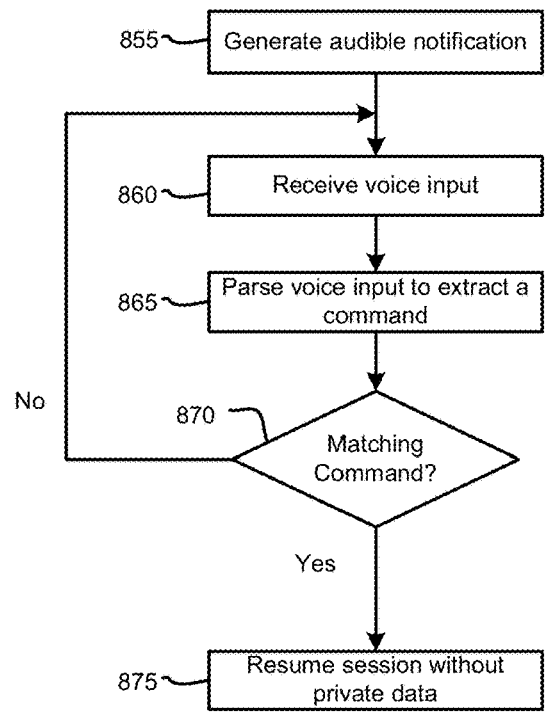
FIG. 8 is a flowchart illustrating a method of handling private data when a local environment of an electronic device is determined to be non-private in accordance with a yet further example embodiment of the present disclosure.
Figure 9:
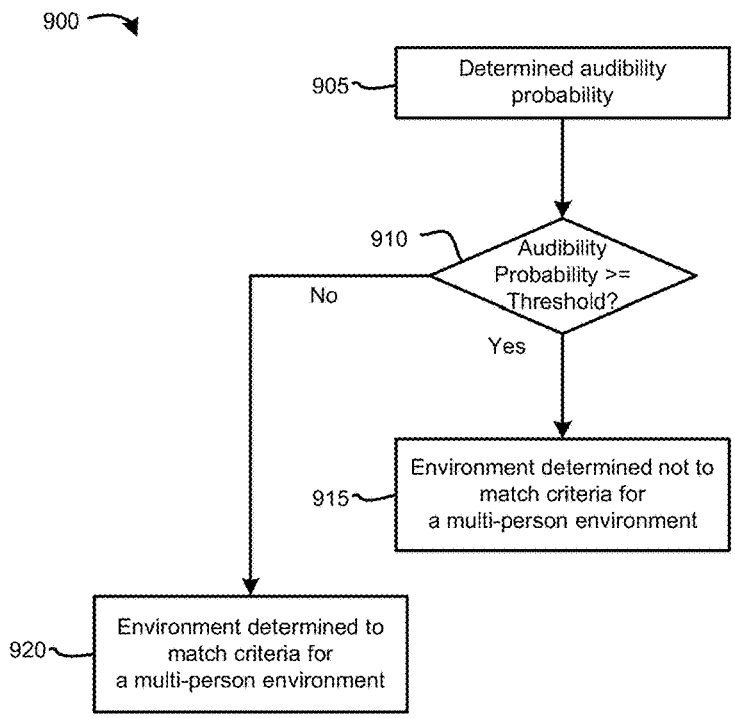
FIG. 9 is a flowchart illustrating a method for determining whether the local environment of an electronic device matches one or more predetermined privacy criteria for a multi-person environment in accordance with one example embodiment of the present disclosure.

Referring to FIG. 9, one embodiment of a method 900 for determining whether the local environment 101 of the voice assistant device 200 matches one or more predetermined privacy criteria for a multi-person environment in accordance with the present disclosure will be described. The method 900 presents one method of accommodating multiple people in an environment, such as multiple people living in a home. In operation 905, a probability (or confidence level) that private information audibly communicated by the voice assistant device 200 may be heard by any of the other persons present in the local environment 101 (e.g., the one or more additional persons in the vicinity of the authenticated user) is determined (e.g., calculated) using the sensed data. The probability, known as an audibility probability, is used by the voice assistant device 200 as a threshold to determine whether the communication session should end or whether some action should be taken for handling private data when the local environment 101 of the voice assistant device 200 is determined to be non-private, as described more fully below in connection with FIG. 5-8. The determination that private information audibly communicated by the voice assistant device 200 may be heard by any of the other persons present in the local environment 101 may be performed in a variety of ways, examples of which are described below.

In operation 910, the voice assistant device 200 compares the determined audibility probability to an audibility probability threshold. The audibility probability threshold may vary between embodiments. The audibility probability threshold may vary based on a privacy setting (or rating) or security setting (or rating) for the communication session or the application associated therewith. For example, if the communication session or application associated therewith has a privacy setting of "high" (e.g., for a banking communication session for a banking application), a lower audibility probability threshold may be used than if the communication session or application associated therewith had a privacy setting of "low". In this way a stricter standard is applied if the communication session or application associated therewith has more private or sensitive data. "high"

The audibility probability threshold may vary based on the number and/or type of sensor data use to determine the audibility probability. For example, when more than one type of sense data is used to determine the audibility probability, the accuracy of the audibility probability may be increased and a lower audibility probability may be used. For one example, if audio data captured by a microphone and image data captured by a camera are used to determine the audibility probability, a lower audibility probability threshold may be used than if only image data is used to determine the audibility probability. For another example, if audio data captured by a microphone is used to determine the audibility probability, a lower audibility probability threshold may be used than if image data captured by a camera is used to determine the audibility probability because audio data is more accurate.

At operation 915, when the audibility probability is determined to be greater than or equal to an audibility probability threshold, the local environment 101 of the voice assistant device 200 is determined not to match the one or more predetermined privacy criteria for a multi-person environment.

At operation 920, when the audibility probability is determined to be less than the audibility probability threshold, the local environment 101 of the voice assistant device 200 is determined to match the one or more predetermined privacy criteria for a multi-person environment.

The voice assistant device 200 may generate a three-dimensional (3D) model of the local environment 101 using the sensed data in the operation 530 as part of a method of determining whether private information audibly communicated by the voice assistant device 200 may be heard by any of the other persons present in the local environment 101. In one example in which the sensed data comprises images from cameras 130 or 230. The voice assistant device 200 acquires, via the one or more cameras 130 or 230, one or more images of the local environment 101 of the voice assistant device 200. The cameras 130 or 230 may be stereoscopic cameras, omnidirectional cameras, rotating cameras, or a 3D scanner. One or more reference points in the one or more images of the local environment 101 of the voice assistant device 200 are identified by the processor 205. A distance to the one or more reference points is determined by the processor 205 via proximity data sensed by the one or more proximity sensors 160 or 260. A 3D model of the local environment 101 of the voice assistant device 200 is determined using the one or more images and the distance to the one or more reference points.

In another example in which the sensed data comprises images audio samples from the microphones 140 or 240, the voice assistant device 200 generates, via the speaker 245, a multi-tone signal. The voice assistant device 200 receives, via the microphone 140 or 240, a reflected multi-tone signal. A 3D model of the local environment 101 of the voice assistant device 200 is generated by the processor 205 using the multi-tone signal and the reflected multi-tone signal.

After the 3D model of the local environment 101 of the voice assistant device 200 is generated using one of the approaches described above or other suitable process, an audio profile of the local environment 101 is generated based on the three-dimensional model and an audio sample of the local environment 101. The audio profile defines a sound transmission pattern within the local environment 101 given its 3D shape as defined by the 3D model of the local environment 101. The audio profile of the local environment is based on the 3D model and an audio sample of the local environment 101.

Next, an audible transmission distance of the voice of the authenticated user is determined based on the audio profile of the local environment 101 as the threshold distance. The audible transmission distance determines a distance from the authenticated user within which the voice of the authenticated user is discernable to other persons in the local environment 101. The audible transmission distance of the voice of the authenticated user is based on the audio profile and one or more characteristics of the voice of the authenticated user, such as voice's pitch, speaking style such as intonation, accent, dialect/vocabulary, etc.

Next, all persons in the local environment 101 are localized via the sensed data, i.e. a relative position of the persons in the local environment 101 is determined. Lastly, for each person other than the authenticated user, a distance of the person from the authenticated user is determined. When the distance of one or more other persons from the authenticated user is more than the audible transmission distance, the local environment 101 of the voice assistant device 200 is determined not to match the one or more predetermined privacy criteria for a multi-person environment (i.e., the local environment 101 is determined to be non-private). When the distance of each of other persons from the authenticated user is less than the audible transmission distance, the local environment 101 of the voice assistant device 200 is determined to match the one or more predetermined privacy criteria for a multi-person environment (i.e., the local environment 101 is determined to be private). Alternatively, an audibility probability may be determined (i.e., calculated) based on the distance of the person from the authenticated user and the audible transmission distance and tested against an audibility probability threshold as described above in connection with FIG. 9. The audibility probability may be a relative measure of the distance of each person from the authenticated user and the audible transmission distance, such as a percentage.

When the local environment 101 of the voice assistant device 200 is determined to match the one or more predetermined privacy criteria for a multi-person environment, communication of private data by the voice assistant is enabled (operation 524). When the local environment 101 of the voice assistant device 200 is determined not to match the one or more predetermined privacy criteria for a multi-person environment, communication of private data by the voice assistant is disabled (operation 526).

The method 500 ends when the communication session ends or the number of permitted authorization attempts is reached (operation 532). Otherwise, the method 500 continues with the voice assistant device 200 sensing the environment 101 and evaluating the results at regular intervals to determine whether the communication session is private.

The voice assistant device 200 sends the result of the privacy analysis and determination to the web application server 315 directly or indirectly via the voice assistant server 305. When the local environment 101 of the voice assistant device 200 is determined to be private, the web application server 315 may generate a security token which is sent to the voice assistant server 305 to authorize the voice assistant of the voice assistant server 305 to access private data stored by the authorization server API 325 and/or resource server API 335, such as banking information. The security token may expire after a predetermined time interval so that, if a subsequent privacy check fails, the security token will no longer be valid and the voice assistant server 305 will no longer access to private data stored by the authorization server API 325 and/or resource server API 335. The time interval for which the security token is valid may be very short to facilitate continuous privacy monitoring.

Figure 5:
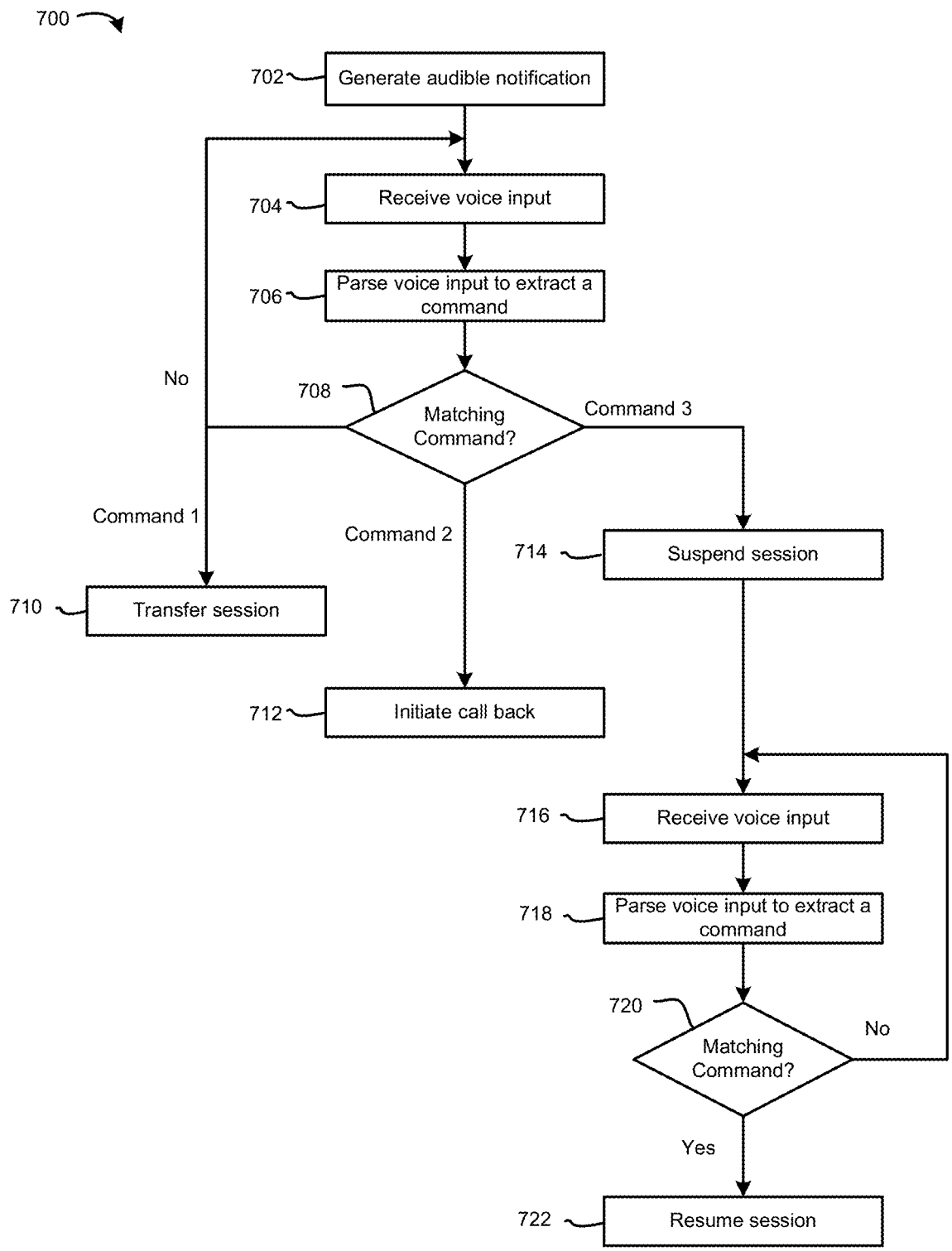
FIG. 5 is a flowchart illustrating a method of handling private data when a local environment of an electronic device is determined to be non-private in accordance with one example embodiment of the present disclosure.

Referring next to FIG. 5, a method 700 of handling private data when the local environment 101 of the voice assistant device 200 is determined to be non-private will be described. The method 700 is performed by a voice assistant device 200 which, as noted above, may be a multipurpose communication device, such as a smartphone or tablet running a VA application, or a dedicated device, such as an IoT device (e.g., smart speaker or similar smart device). The local environment 101 of the voice assistant device 200 may be determined to be non-private in a number of ways, as described herein. For example, the local environment 101 of the voice assistant device 200 may be determined to be non-private in that more than one person is determined to be in the local environment, when one person is determined to be in the local environment 101 of the voice assistant device 200 but that one person is determined not to be the authenticated user, or when the local environment of the electronic device is determined not to match the one or more predetermined privacy criteria for a multi-person environment.

The voice assistant device 200 generates, via the speaker 245 of the voice assistant device 200, an audible notification that the communication session is not private (operation 702). The notification may comprise a voice prompt whether to continue the communication session via a different channel or continue the communication session from a private location, such as a call back, transfer of the communication session to another electronic device 400, such as a mobile phone, or suspending the communication session so that the user can relocate.

The voice assistant device 200 receives a voice input via the microphone 240 (operation 704). The processor 205 parses, via speech recognition, the voice input to extract a command to be performed from a plurality of commands (operation 706). The processor 205 then determines a matching command (operation 708). The voice assistant device 200 transfers the communication session to a second electronic device 400 in response to the voice input containing a first command (operation 710). The voice assistant device 200 initiates a call back to a designated telephone number in response to the voice input containing a second command, and ends the communication session (operation 712). The voice assistant device 200 temporarily suspends the communication session in response to the voice input containing a third command (operation 714).

While the communication session is temporarily suspended, the voice assistant device 200 may receive a voice input via the microphone 240 (operation 716). Next, the voice assistant device 200 parses, via speech recognition, the voice input to extract a command to be performed from a plurality of commands (operation 718). The processor 205 then determines a matching command (operation 720). The voice assistant device 200 may resume the communication session from the temporary suspension in response to the voice input containing a corresponding command (operation 722).

Figure 6:
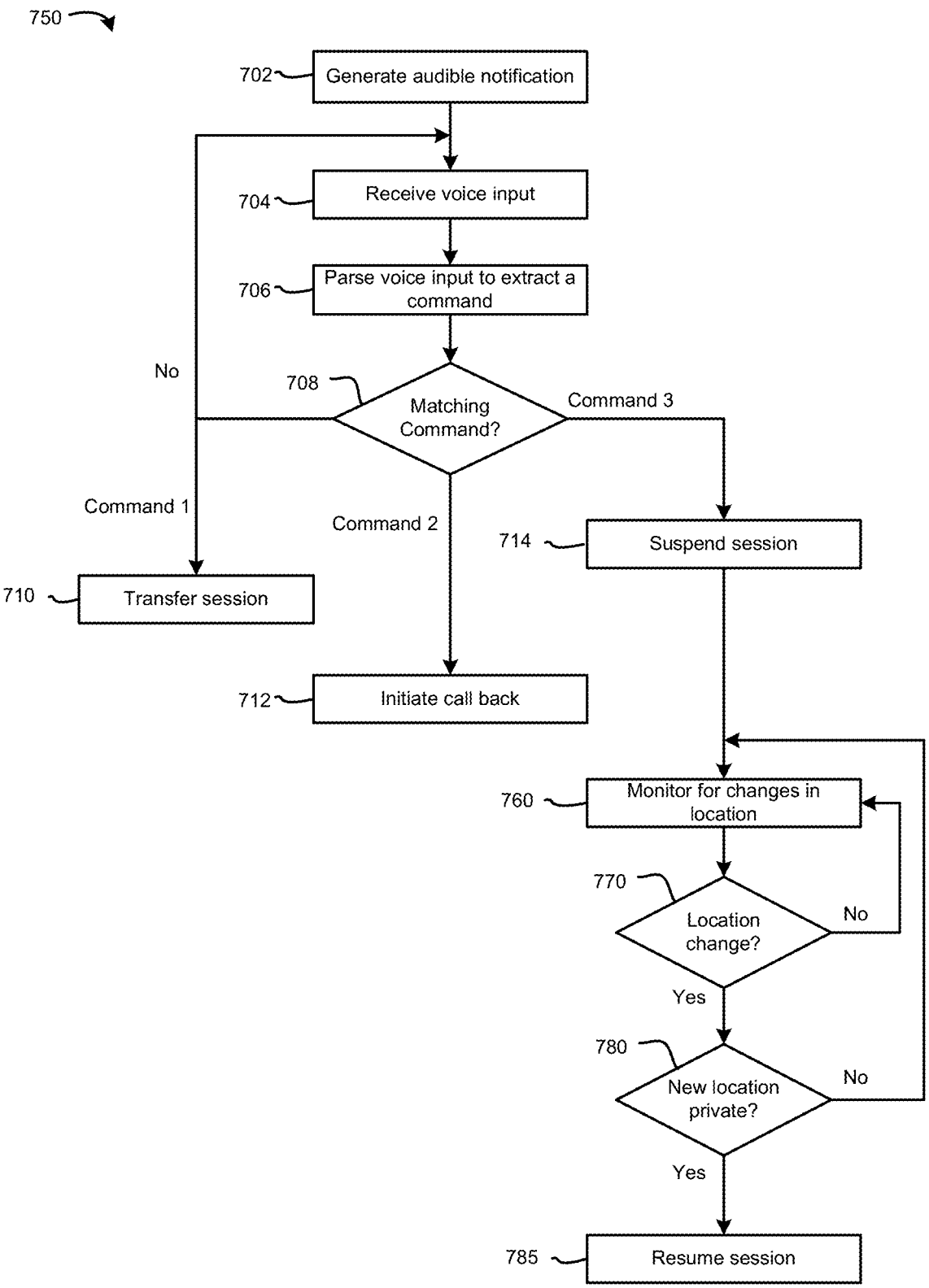
FIG. 6 is a flowchart illustrating a method of handling private data when a local environment of an electronic device is determined to be non-private in accordance with another example embodiment of the present disclosure.

FIG. 6 illustrates another embodiment of a method 750 of handling private data when the local environment 101 of the voice assistant device 200 is determined to be non-private will be described. The method 750 is similar to the method 700 except that while the communication session is temporarily suspended, the voice assistant device 200 monitors for changes in the location of the voice assistant device 200 (operation 760). When the voice assistant device 200 has moved more than a threshold distance (operation 770), the voice assistant device 200 determines whether the authenticated user has moved to a private location (operation 780). The voice assistant device 200 may automatically resume the communication session from the temporary suspension in response to a determination that the authenticated user has moved to a private location (operation 785). The determination that a location is a private location is based on location data, such as satellite-based location data (e.g., GPS data) or location data derived from sensor data such as proximity data. A location may be determined to be a private location if it is an enclosed room, a designated room or set or location (which may be defined by a set of predefined GPS locations), a new location that is at least a threshold distance from the location at which it was determined that the communication session is not private, among other possibilities.

Figure 7:
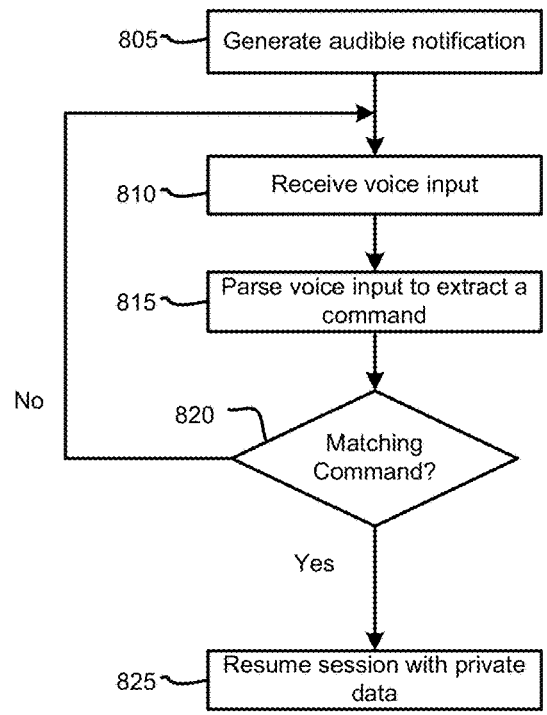
FIG. 7 is a flowchart illustrating a method of handling private data when a local environment of an electronic device is determined to be non-private in accordance with a further example embodiment of the present disclosure.

FIG. 7 illustrates a further embodiment of a method 800 of handling private data when the local environment 101 of the voice assistant device 200 is determined to be non-private will be described. The voice assistant device 200 generates, via the speaker 245 of the voice assistant device 200, an audible notification that the communication session is not private and comprises a voice prompt whether to continue communication of private data even though the communication session is not private (operation 805). The voice assistant device 200 receives a voice input via the microphone 240 (operation 810). The processor 205 parses, via speech recognition, the voice input to extract a command to be performed from a plurality of commands (operation 815). The processor 205 then determines a matching command (operation 820). The voice assistant device 200 re-enables the communication of private data in response to the voice input containing a corresponding command (operation 825). This allows the user to continue communication of private data even though the communication session is not private, with the user bearing the security risks associated therewith.

FIG. 8 illustrates a yet further embodiment of a method 850 of handling private data when the local environment 101 of the voice assistant device 200 is determined to be non-private will be described. The voice assistant device 200 generates, via the speaker 245 of the voice assistant device 200, an audible notification that the communication session is not private and comprises a voice prompt whether to continue the communication session with only non-private data (operation 855). The voice assistant device 200 receives a voice input via the microphone 240 (operation 860). The processor 205 parses, via speech recognition, the voice input to extract a command to be performed from a plurality of commands (operation 865). The processor 205 then determines a matching command (operation 870). Next, the voice assistant device 200 may terminate the communication session in response to the voice input containing a corresponding command, or continue the communication session in response to the voice input containing a corresponding command (operation 875).

The methods 700, 750, 800 and 850 described above that may be performed whenever the local environment 101 of the voice assistant device 200 is determined to be non-private.

Figure 4:
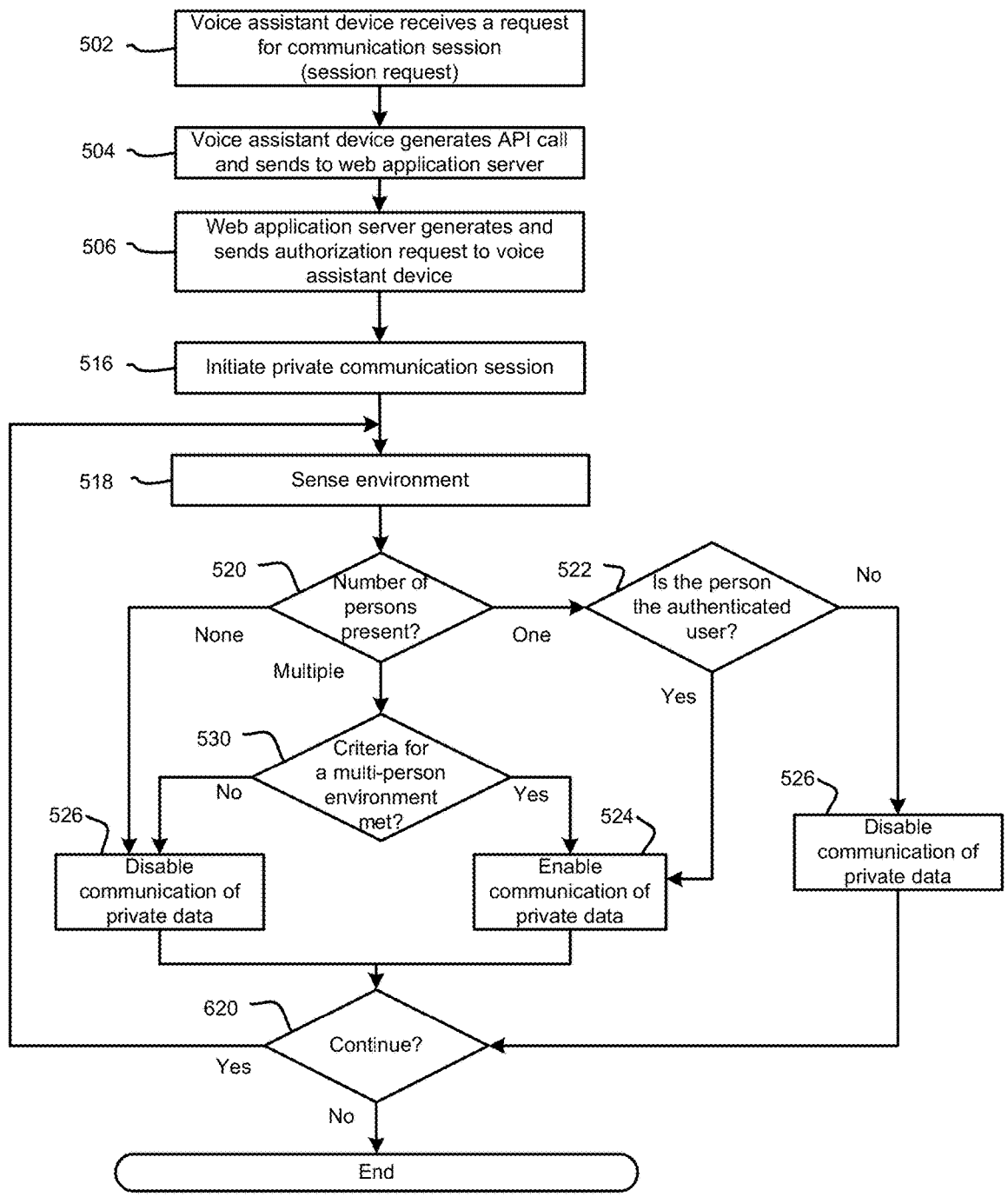
FIG. 4 is a flowchart illustrating a method of enforcing privacy during a communication session with a voice assistant on an electronic device in accordance with another example embodiment of the present disclosure.

Referring next to FIG. 4, a method 600 of enforcing privacy during a communication session with a voice assistant in accordance with one example embodiment of the present disclosure will be described. The method 600 is similar to the method 500 described above in connection with FIG. 3 with the notable difference that the user of the voice assistant device 200 is not authenticated after the request to initiate a communication session. Because the user of the voice assistant device 200 is not authenticated before initiating the communication session, multi-person support is not permitted for increased security. Thus, when more than one person is present in the environment of the electronic device, communication of private data by the voice assistant is disabled. In other embodiments, multi-person support may be permitted even though the user of the voice assistant device 200 is not authenticated before initiating the communication session.

In the method 600, when one person is present in the local environment 101 of the voice assistant device 200, the sensor data is processed to identify the one person (operation 522), and determine whether the one person is an authorized user (operation 610). When the one person in the environment is determined to be an authorized user, communication of private data by the voice assistant is enabled (operation 524). When the one person in the environment is determined not to be an authorized user, communication of private data by the voice assistant is disabled (operation 526). In the method 600, when no one is present in the local environment 101 of the voice assistant device 200, communication of private data by the voice assistant may also be disabled (operation 526).

The method 600 ends when the communication session ends (operation 620). Otherwise, the method 500 continues with the voice assistant device 200 sensing the environment 101 and evaluating the results at regular intervals to determine whether the local environment 101 in which the communication session is being held is private.

Although the various aspects of the method have been described as being performed by the voice assistant device 200 for the security of user data, in other embodiments processing steps may be performed by the voice assistant server 305, the web application server 315, or other intermediary entity (e.g., server) between the voice assistant device 200 and the web application server 315. In such alternate embodiments, the voice assistant device 200 merely collects data from the sensors 110 and/or 215, sends the sensor data to the voice assistant server 305, web application server 315 or other intermediary entity for analysis, receives the privacy enforcement instructions, and then applies privacy enforcement instructions.

Transfer a Secure Communication Session

Figure 11:
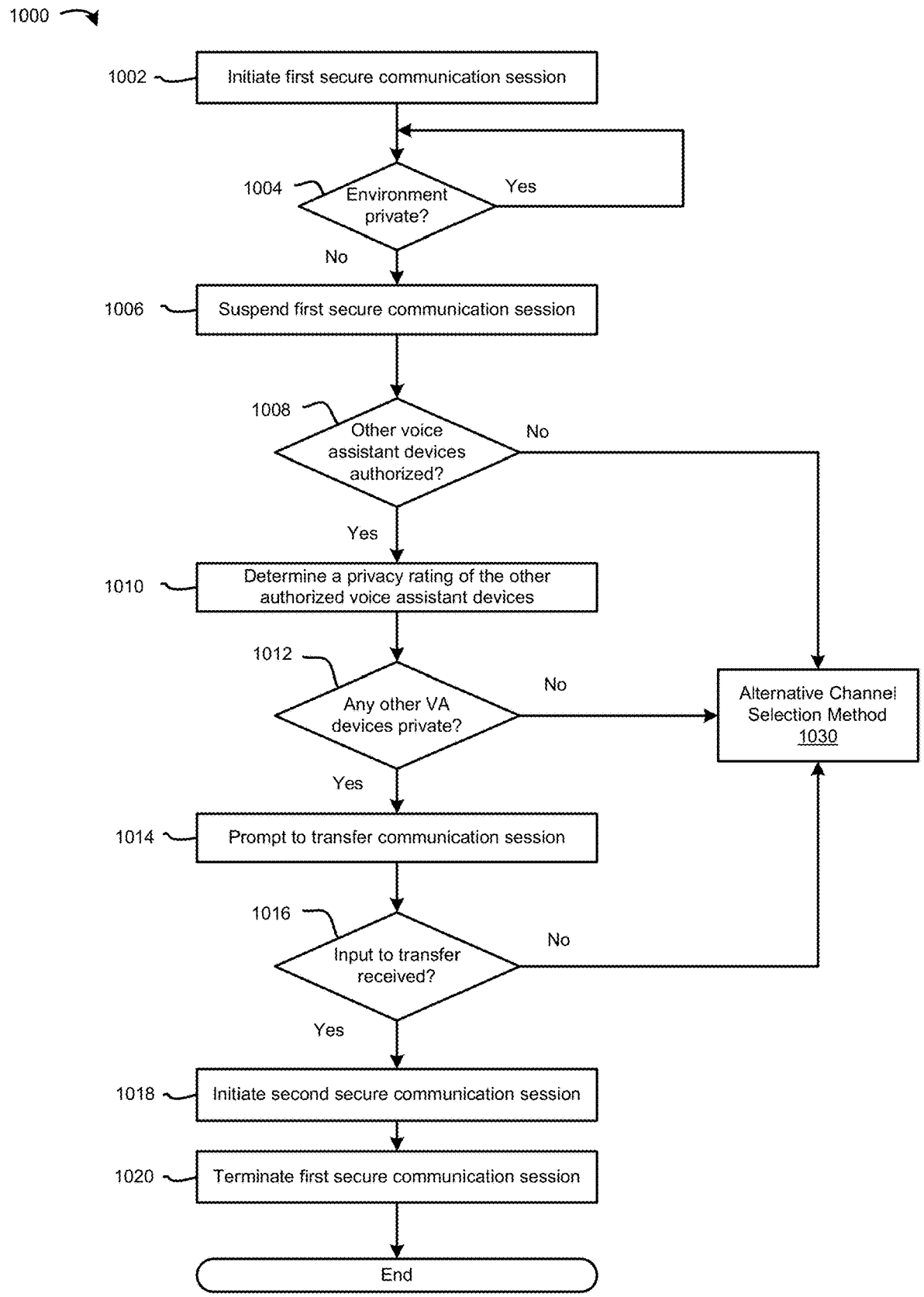
FIG. 11 is a flowchart illustrating a method of transferring a secure communication session between a voice assistant device and an application server in accordance with one example embodiment of the present disclosure.

Referring to FIG. 11, one embodiment of a method 1000 of transferring a secure communication session between a voice assistant device and a voice assistant server in accordance with the present disclosure will be described. The method 1000 may be performed at least in part by the web application server 315.

At operation 1002, a first secure communication session is initiated between a first voice assistant device 200 and the web application server 315 for a resource owner, such as a user of a banking application. The first secure communication session may be initiated in response to an input or command received from the user, as described above. The first secure communication session is facilitated by a voice assistant and may be initiated in response to a request received by the banking application as user input, for example, received as voice input as described above. The first secure communication session authorizes the web application server 315 to access private data in a secure resource via the resource server API 335, and communicate private data from the secure resource to authorized voice assistant devices 200 via the communication module 354. An example of the secure resource is a business services server 380, such as bank server storing banking data and configured to perform data transfers/transactions among other functions. Session data for the first secure communication session is stored by the web application server 315 in a secure container, for example, by the session manager 355. An example of the secure communication session is a private banking session between the voice assistant device 200 and the bank server initiated by a banking application of a financial institution on the voice assistant device 200. The banking application may be used to view balances and perform (e.g., send/receive) data transfers/transactions among other functions.

At operation 1004, the web application server 315 determines whether the local environment 101 of the first voice assistant device 200 is private using one or more of the methods describe above. This determination may be performed locally by the first voice assistant device 200 or by the web application server 315 based on sensor data provided by the first voice assistant device 200. This determination is performed at different times throughout the first secure communication session, for example, at the start of the first secure communication session and periodically thereafter, as described above. The first secure communication session continues in response to a determination that the local environment 101 of the first voice assistant device 200 is private.

At operation 1006, in response to a determination that the local environment 101 of the first voice assistant device 200 is not private, the web application server 315 suspends the first secure communication session between the first voice assistant device 200 and the web application server 315. Thus, the determination that the local environment 101 of the first voice assistant device 200 is not private acts as an intent for web application server 315.

At operation 1008, the web application server 315 determines from an authorization table 357 stored by the web application server 315 whether any other voice assistant devices 200 have been authorized for communication with the web application server 315. The authorization table 357 comprises authorization information from the authorization table 372 maintained by the authorization server 370 as well as additional information concerning the authorized voice assistant devices 200. For example, the authorization table 357 comprises a listing that specifies for each authorized voice assistant device 200: a device ID such as a MAC address, a device name assigned by the user or device vendor, an access token ID, a date the access token was granted, and a date the access token expires, a context, one or more communication addresses of one or more communication types (e.g., IP address, email address, phone number, or other messaging address such as a proprietary application messaging address, etc.), and a privacy rating. The authorization table 357 may specify whether the voice assistant device 200 is shared, and if so, the other users with whom the voice assistant device 200 is shared. An example authorization table is provided below.

| Device ID | Device Name | Access Token | Context | Communication Address | Privacy Rating |
|---|---|---|---|---|---|
| MAC1 | D1 | OAuth1 | Home | 12.34.56.78 | Private |
| MAC2 | D2 | OAuth2 | Office | 416-555-5555 | Non-Private |
| ... | ... | ... | ... | ... | ... |
| MACn | Dn | OAuthn | Car | #td5*8 | Private |

The context may comprise a state or location of the voice assistant device 200, among other contextual parameters. The one or more communication addresses may define a designated or primary communication address. The device name may be based on the location or type of location, e.g., car, kitchen, den, etc. Alternatively, a location may be assigned by the user or the web application server 315 which may be defined by a specific coordinate, a geofence or coordinate range (e.g., based on GPS coordinates). The location may be define by a common name such "Office", "Home", "Cottage", "Car" etc.

The web application server 315 determines for each of the one or more other voice assistant devices 200 in the authorization table 357 whether an access token is stored by the web application server 315, and if so, determine for each access token stored by the web application server 315 whether the access token is valid (i.e., unexpired). The determination whether the access token is valid may be based on the date the access token was granted and/or the date the access token expires.

A session token distinct from the access token may be generated by the authorization server 370 for each authorized voice assistant device 200 and possibly other authorized devices in some embodiments. The access token and session token are generated during a setup/registration process that is outside the scope of the present disclosure. A session token has a shorter expiry duration than an access token. The expiry duration of the session token may be set by the operator of the authorization server 370, web application server 315 or business services server 380. Session tokens are assigned to each device similar to the access tokens. The session tokens may be renewed with the start of each secure communication session or which each communication in which the session token is validated in some embodiments. Before a session token is granted, the user of the voice assistant device 200 is authenticated by requesting a shared secret (e.g., password, passcode, PIN, security question answers or the like) and verifying the input received in response to the request. For example, when the session token is not valid for a second voice assistant device 200 to which the secure communication session is to be transferred, the web application server 315 sends instructions to the second voice assistant device 200 that causes the second voice assistant device 200 to generate a prompt for input of the shared secret. The authorization server 370 determines whether received input matches the shared secret. The session token is renewed, or a new session token is granted, in response to receiving input matching the shared secret. In addition, the second secure communication session between the second voice assistant device 200 and the web application server 315 is initiated only in response to receiving input matching the shared secret. Alternatively, as an additional security measure the user may be prompted to provide the shared secret before transferring the conversation even when the session token is valid or security token is not required.

In response to a determination that no other voice assistant devices have been authorized for communication with the voice assistant server 305, operations proceed to the alternative channel selection method 1030 for selecting an alternate channel for continuing a conversation, as described below.

At operation 1010, in response to a determination that one or more other voice assistant devices have been authorized for communication with the voice assistant server, the web application server 315 determines a privacy rating of each of the one or more other voice assistant devices 200 that have been authorized for communication with the web application server 315. The privacy rating may be stored by the web application server 315, for example, in the authorization table 357. As noted above, the privacy rating may be provided by each respective voice assistant device or determined by the application server based on sensor data provided by each respective voice assistant device. Alternatively, the privacy rating may be determined in real-time.

At operation 1012, the web application server 315 determines based on the privacy rating for each of the one or more other voice assistant devices 200 that have been authorized for communication with the web application server 315 whether the environment 101 in which the respective voice assistant device 200 is located is private. The second secure communication session between the second voice assistant device 200 and the web application server 315 is initiated only when the environment 101 in which the second voice assistant device 200 is located is determined to be private.

In response to a determination that none of the one or more other voice assistant devices 200 that have been authorized for communication with the web application server 315 are located in an environment that has been determined to be private, operations proceed to the alternative channel selection method 1030, described below.

At operation 1014, in response to a determination that at least one of the other voice assistant devices 200 that have been authorized for communication with the web application server 315 are located in an environment that has been determined to be private, the web application server 315 sends instructions to the first voice assistant device 200 that causes the first voice assistant device 200 to generate a prompt for input whether to transfer the first secure communication session to one of the one or more other voice assistant devices 200 that have been authorized for communication with the web application server 315.

The prompt may include a device name for each of the one or more other voice assistant devices 200 in some embodiments. In such embodiments, the web application server 315 determines from the authorization table 357 stored by the web application server 315 a device name for each of the one or more other voice assistant devices 200. The instructions sent to the first voice assistant device 200 include the device name for each of the one or more other voice assistant devices 200 so that the prompt generated by the first voice assistant device 200 identifies each of the one or more other voice assistant devices 200 by a respective device name. The prompt is configured to prompt for selection of one of the one or more other voice assistant devices 200 by the respective device name. The web application server 315 is configured to, in response to input of a device name of an authorized voice assistant device 200, initiate the second secure communication session between the voice assistant device 200 identified by the input device name of an authorized voice assistant device 200 and the web application server 315. The web application server 315 is further configured to terminate the secure communication session between the first voice assistant device 200 and the web application server 315 in response to successful initiation of the second secure communication session between the voice assistant device 200 identified by the input device name and the web application server 315. Only devices names for voice assistant devices 200 located in an environment determined to be private are included in the prompt.

The prompt may be a voice prompt. For example, the voice assistant may audibly announce on the first voice assistant device 200: "This conversation is no longer private. Would you like to continue this conversation on another device?" In some examples, the voice assistant may suggest another voice assistant device 200 based on the privacy rating and optionally a context of the voice assistant device 200 when more than one other voice assistant device 200 is in an environment determined to be private.

The context may comprise location based on the proximity of the other voice assistant devices 200 to the first voice assistant device 200 currently in use (or user), recent history/use of the other voice assistant devices 200 (which may be determined by the most recent session, for example, from the mostly recently renewed session token) or both if more than one other voice assistant device 200 is within a threshold distance to the first voice assistant device 200 (or user), e.g., if more than one voice assistant device 200 is within the same geofence or other bounded location.

When more than one other voice assistant device 200 is in an environment determined to be private, a best matching alternate voice assistant device 200 is determined and suggested in the prompt. For example, when the best matching alternate voice assistant device 200 is a device located in the "Den", the voice assistant may audibly announce on the first voice assistant device 200: "This conversation is no longer private. Would you like to continue this conversation in the Den?" The alternate voice assistant device 200 may alternatively be identified by device name rather than location.

At operation 1016, the web application server 315 determines whether input to transfer the first secure communication session to one of the one or more other voice assistant devices that have been authorized for communication with the web application server 315 is received. The web application server 315 monitors for a response from the first voice assistant device 200, analyses the response, and responds accordingly.

At operation 1018, in response to input to transfer the first secure communication session to one of the one or more other voice assistant devices 200 that have been authorized for communication with the web application server 315, a second secure communication session between a second voice assistant device 200 and the web application server 315 is initiated. As part of initiating the second secure communication session, session data associated with the conversation to which the first secure communication session belongs is transferred to the second secure communication session with the second voice assistant device 200.

At operation 1020, the first secure communication session between the first voice assistant device 200 and the web application server 315 is terminated in response to successful initiation of the second secure communication session between the second voice assistant device 200 and the web application server 315.

Figure 12:
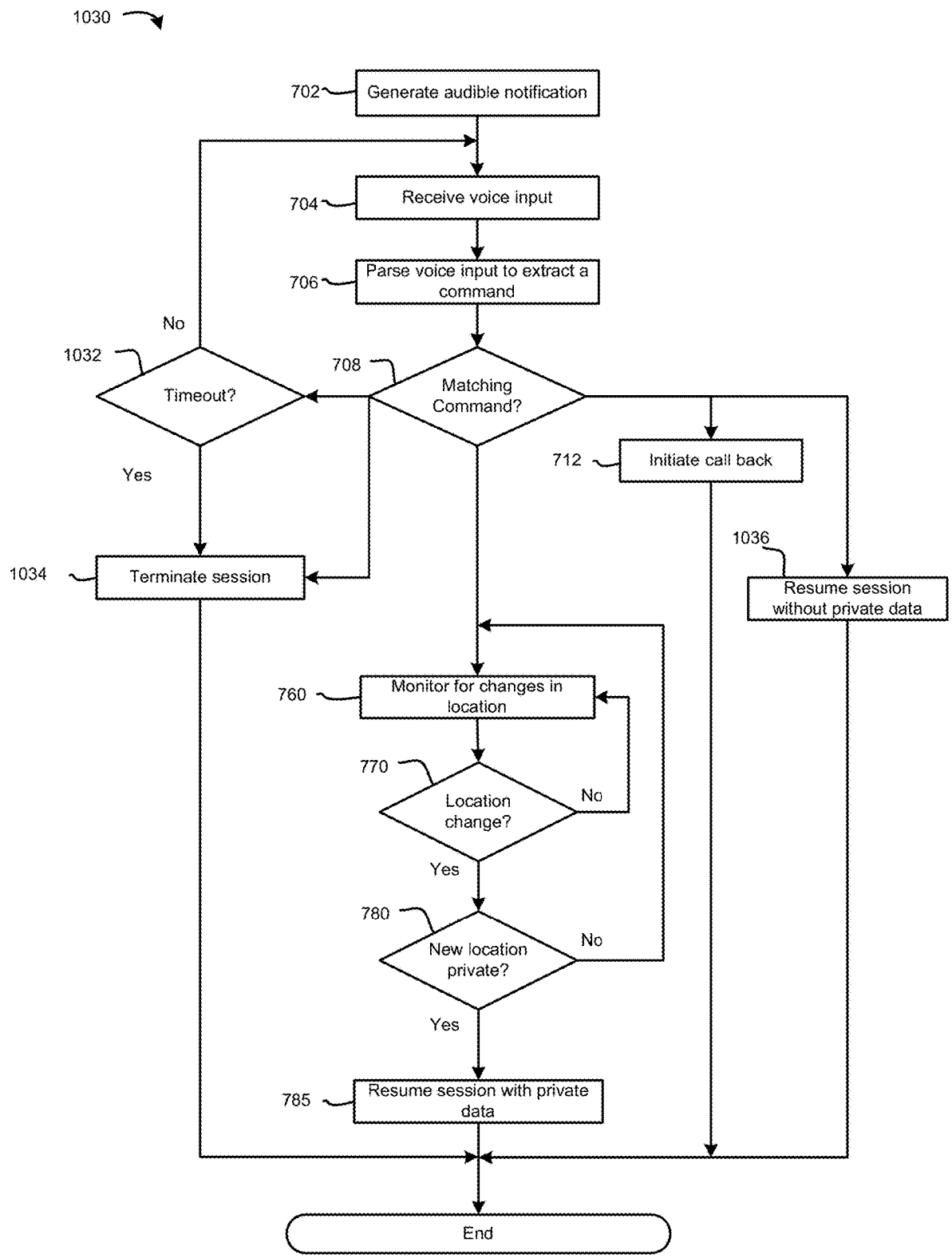
FIG. 12 is a flowchart illustrating a method of selecting an alternate channel for continuing a conversation in accordance with one example embodiment of the present disclosure.

Referring to FIG. 12, one embodiment of a method 1030 of selecting an alternate channel for continuing a conversation in accordance with the present disclosure will be described. The method 1030 may be performed at least in part by the web application server 315. The method 1030 is similar to the method 750 in many respects. The method 1030 may be adapted based on the methods 700, 800 or 850.

At operation 702, the voice assistant device 200 generates, via the speaker 245 of the voice assistant device 200, an audible notification that the first secure communication session is not private. The notification comprises a voice prompt whether to: (i) continue the conversation via a call back, (ii) continue suspending the first secure communication session so that the user can relocate to a private location to continue the conversation, (iii) resume the conversation without private data, or (iv) terminate the first secure communication session.

The voice assistant device 200 receives a voice input via the microphone 240 (operation 704). The processor 205 parses, via speech recognition, the voice input to extract a command to be performed from a plurality of commands (operation 706). The processor 205 then determines a matching command (operation 708).

The voice assistant device 200 may initiate a call back to a designated telephone number from an automated attendant, IVR system, or other endpoint (e.g., live attendant) in response to the voice input containing a matching command, and then terminates the first secure communication session in response to successfully initiating the call back and transferring the state information to an automated attendant, IVR system or other endpoint (operation 712).

The voice assistant device 200 may continue to temporarily suspend the first secure communication session in response to the voice input containing another matching command. While the communication session is temporarily suspended, the voice assistant device 200 monitors for changes in the location of the voice assistant device 200 (operation 760). When the voice assistant device 200 has moved more than a threshold distance (operation 770), the voice assistant device 200 determines whether the authenticated user has moved to a private location (operation 780). The voice assistant device 200 may automatically resume the first secure communication session from the temporary suspension with the communication of private data enabled in response to a determination that the voice assistant device 200 or user has moved to a private location (operation 785).

While the communication session is temporarily suspended, the voice assistant device 200 may continue to monitor for and receive voice inputs via the microphone 240, and if a command/input to resume the first secure communication session is received irrespective of a change in location or instead of monitoring for a change in location, resumes the first secure communication session with private data.

The voice assistant device 200 may resume the first secure communication session without private data in response to the voice input containing another matching command (operation 1036).

At operation 1032, the web application server 315 may terminate the first secure communication session if a valid response is not received within a threshold duration (i.e., timeout duration). The threshold duration may be set by a countdown timer of the session manager 355 of the web application server 315.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, erasable programmable ROM (EPROM) memory, electrically EPROM (EEPROM) memory, and non-volatile RAM (NVRAM) memory. The above memory types are example only, and are thus not limiting as to the types of memory usable for storage of a computer program.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods. In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. An application server, comprising:
   a processor;
   a memory coupled to the processor, the memory having stored thereon executable instructions that, when executed by the processor, cause the application server to:
      initiate a first secure communication session between a first voice assistant device and the application server for a resource owner, wherein a secure communication session authorizes the application server to access private data in a secure resource and communicate private data from the secure resource to other devices, wherein session data for the first secure communication session is stored by the application server in a secure container;
      in response to a determination that an environment of the first voice assistant device is not private:
         suspend the first secure communication session between the first voice assistant device and the application server;
         determine from an authorization table stored by the application server whether any other voice assistant devices have been authorized for communication with the application server;
         in response to a determination that one or more other voice assistant devices have been authorized for communication with the application server:
            cause the first voice assistant device to generate a prompt for input whether to transfer the first secure communication session to one of the one or more other voice assistant devices that have been authorized for communication with the application server;
         in response to input to transfer the first secure communication session to one of the one or more other voice assistant devices that have been authorized for communication with the application server:
            initiate a second secure communication session between a second voice assistant device and the application server; and
            terminate the first secure communication session between the first voice assistant device and the application server in response to successful initiation of the second secure communication session between the second voice assistant device and the application server.

2. The application server of claim 1, wherein the executable instructions, when executed by the processor, further cause the application server to:
   before initiating the second secure communication session between the second voice assistant device and the application server:
      determine whether a session token for the second voice assistant device is valid;
      in response to a determination that the session token for the second voice assistant device is not valid;
         cause the second voice assistant device to generate a prompt for input of a shared secret;
         determine whether input received in response to the prompt matches the shared secret; and
      in response to input matching the shared secret, renew the session token and initiate the second secure communication session between the second voice assistant device and the application server.

3. The application server of claim 1, wherein the executable instructions to determine from the authorization table stored by the application server whether any other voice assistant devices have been authorized for communication with the application server, when executed by the processor, further cause the application server to:
   determine for each of the one or more other voice assistant devices in the authorization table whether an access token is stored by the application server.

4. The application server of claim 3, wherein the executable instructions to determine for each of the one or more other voice assistant devices in the authorization table whether an access token is stored by the application server, when executed by the processor, further cause the application server to:
   determine for each access token stored by the application server whether the access token is valid.

5. The application server of claim 1, wherein the first secure communication session and second secure communication session are implemented using the OAuth (Open Authorization) 2.0 standard or a successor thereto.

6. The application server of claim 1, wherein the executable instructions, when executed by the processor, further cause the application server to:
   in response to a determination that the one or more other voice assistant devices have been authorized for communication with the application server;
      determine from the authorization table stored by the application server a device name for each of the one or more other voice assistant devices;
   wherein the prompt generated by the first voice assistant device identifies each of the one or more other voice assistant devices by a respective device name, the prompt being configured to prompt for selection of one of the one or more other voice assistant devices by the respective device name.

7. The application server of claim 6, wherein the executable instructions, when executed by the processor, further cause the application server to:
in response to input of a device name of an authorized voice assistant device:
initiate the second secure communication session between the voice assistant device identified by the input device name of an authorized voice assistant device and the application server; and
terminate the first secure communication session between the first voice assistant device and the application server in response to successful initiation of the second secure communication session between the voice assistant device identified by the input device name and the application server.

8. The application server of claim 6, wherein the executable instructions, when executed by the processor, further cause the application server to:
determine for each of the one or more other voice assistant devices that have been authorized for communication with the application server whether an environment in which the respective voice assistant device is located is private;
wherein only devices names for voice assistant devices located in the environment determined to be private are included in the prompt.

9. The application server of claim 1, wherein the executable instructions, when executed by the processor, further cause the application server to:
determine for each of the one or more other voice assistant devices that have been authorized for communication with the application server whether an environment in which the respective voice assistant device is located is private;
wherein the second secure communication session between the second voice assistant device and the application server is initiated only when the environment in which the second voice assistant device is located is determined to be private.

10. The application server of claim 9, wherein the executable instructions, when executed by the processor, further cause the application server to:
in response to a determination that none of the one or more other voice assistant devices that have been authorized for communication with the application server is located in an environment that has been determined to be private:
cause the first voice assistant device to generate a prompt for input whether to initiate a call back to a designated telephone number; and
initiate the call back to the designated telephone number in response to input to initiate the call back.

11. The application server of claim 9, wherein the executable instructions to determine for each of the one or more other voice assistant devices that have been authorized for communication with the application server whether an environment in which the respective voice assistant device is located is private, when executed by the processor, further cause the application server to:
determine a privacy rating for each of the one or more other voice assistant devices that have been authorized for communication with the application server.

12. The application server of claim 11, wherein the privacy rating is provided by each respective voice assistant device.

13. The application server of claim 11, wherein the privacy rating is determined by the application server based on sensor data provided by each respective voice assistant device.

14. The application server of claim 9, wherein the executable instructions to determine for each of the one or more other voice assistant devices that have been authorized for communication with the application server whether an environment in which the respective voice assistant device is located is private, when executed by the processor, further cause the application server to:
receive sensor data by each of the one or more other voice assistant devices that have been authorized for communication with the application server;
process the sensor data to determine, for each of the one or more other voice assistant devices that have been authorized for communication with the application server, whether a person is present in the environment in which the respective voice assistant device is located;
wherein the environment in which a respective voice assistant device is located is determined to be private only when no person is present in the environment in which the respective voice assistant device is located.

15. The application server of claim 9, wherein the executable instructions to determine for each of the one or more other voice assistant devices that have been authorized for communication with the application server whether an environment in which the respective voice assistant device is located is private, when executed by the processor, further cause the application server to:
receive sensor data by each of the one or more other voice assistant devices that have been authorized for communication with the application server;
process the sensor data to determine, for each of the one or more other voice assistant devices that have been authorized for communication with the application server, whether a person is present in the environment in which the respective voice assistant device is located;
in a response to a determination that at least one person is present in the environment in which a respective voice assistant device is located, determine whether the environment of the respective voice assistant device matches one or more predetermined privacy criteria for a multi-person environment;
wherein the environment in which a respective voice assistant device is located is determined to be private only when the environment of the respective voice assistant device matches the one or more predetermined privacy criteria for the multi-person environment.

16. The application server of claim 15, wherein the one or more predetermined privacy criteria for the multi-person environment comprises each person other than the resource owner being more than a threshold distance from the second voice assistant device.

17. The application server of claim 15, wherein the one or more predetermined privacy criteria for the multi-person environment comprises each person other than the resource owner being an authorized user.

18. The application server of claim 1, wherein the executable instructions, when executed by the processor, further cause the application server to:

periodically during the first communication session determine whether the environment of the first voice assistant device is private.

19. The application server of claim 1, wherein the executable instructions, when executed by the processor, further cause the application server to:
in response to a determination that no other voice assistant devices have been authorized for communication with the application server:
cause the first voice assistant device to generate a prompt for input whether to initiate a call back to a designated telephone number; and
initiate the call back to the designated telephone number in response to input to initiate the call back.

20. A method of transferring a secure communication session between a voice assistant device and an application server, comprising:
initiating a first secure communication session between a first voice assistant device and the application server for a resource owner, wherein a secure communication session authorizes the application server to access private data in a secure resource and communicate private data from the secure resource to other devices, wherein session data for the first secure communication session is stored by the application server in a secure container;
in response to a determination that an environment of the first voice assistant device is not private:
suspending the first secure communication session between the first voice assistant device and the application server;
determining from an authorization table stored by the application server whether any other voice assistant devices have been authorized for communication with the application server;
in response to a determination that one or more other voice assistant devices have been authorized for communication with the application server:
causing the first voice assistant device to generate a prompt for input whether to transfer the first secure communication session to one of the one or more other voice assistant devices that have been authorized for communication with the application server;
in response to input to transfer the first secure communication session to one of the one or more other voice assistant devices that have been authorized for communication with the application server:
initiating a second secure communication session between a second voice assistant device and the application server; and
terminating the first secure communication session between the first voice assistant device and the application server in response to successful initiation of the second secure communication session between the second voice assistant device and the application server.

* * * * *